United States Patent
Doraiswamy et al.

(10) Patent No.: US 11,180,985 B2
(45) Date of Patent: Nov. 23, 2021

(54) SYSTEMS AND METHODS FOR DYNAMIC LIQUID LEVEL MONITORING AND CONTROL

(71) Applicants: Sriram Doraiswamy, Spring, TX (US); Ted A. Long, Spring, TX (US); Neal L. Adair, Spring, TX (US)

(72) Inventors: Sriram Doraiswamy, Spring, TX (US); Ted A. Long, Spring, TX (US); Neal L. Adair, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 474 days.

(21) Appl. No.: 16/165,265

(22) Filed: Oct. 19, 2018

(65) Prior Publication Data
US 2019/0120042 A1    Apr. 25, 2019

(30) Foreign Application Priority Data

Oct. 24, 2017   (CA) ................................ CA 2983541
Oct. 15, 2018   (CA) ................................ CA 3020827

(51) Int. Cl.
     *E21B 47/047*      (2012.01)
     *E21B 47/003*      (2012.01)
     (Continued)

(52) U.S. Cl.
     CPC .......... *E21B 47/047* (2020.05); *E21B 43/122* (2013.01); *E21B 43/14* (2013.01);
     (Continued)

(58) Field of Classification Search
     CPC ......... G01F 1/662; G01F 23/296; G01V 1/40; G01V 9/02; E21B 47/047; E21B 47/003;
     (Continued)

(56) References Cited

U.S. PATENT DOCUMENTS

| | | | | |
|---|---|---|---|---|
| 2010/0101793 | A1* | 4/2010 | Symington | ......... E21B 43/2405 166/302 |
| 2011/0067882 | A1* | 3/2011 | Yeriazarian | ............. E21B 43/14 166/369 |
| 2017/0030173 | A1* | 2/2017 | MacPhail | ................ E21B 43/14 |

FOREIGN PATENT DOCUMENTS

| | | | |
|---|---|---|---|
| CA | 2737691 | 4/2010 | |
| WO | WO-2013135288 A1 * | 9/2013 | ............. E21B 47/06 |

OTHER PUBLICATIONS

SageWatch™ Subsurface Surveillance System sensor system giving real-time gauge system available from SageRider, Inc.; retrieved from the internet on Oct. 17, 2018 at: http://www.sageriderinc.com/products/sagewatch-casing-conveyed-real-time-gauge-system 2 pages.

(Continued)

*Primary Examiner* — Natalie Huls
*Assistant Examiner* — Michael J Singletary
(74) *Attorney, Agent, or Firm* — ExxonMobil Upstream Research Company—Law Department

(57) ABSTRACT

Methods and systems for determining a liquid level above a horizontal segment of a wellbore in a formation are disclosed. Local temperatures and pressures are determined for each of a plurality of zones along the wellbore segment. For each zone, a local inflow rate is determined for fluids entering the wellbore from the formation. Based on the local inflow rate, local temperature, and local pressure, a local reservoir pressure is determined, and a local liquid level is determined based on the local reservoir pressure and a pressure associated with an injector wellbore positioned above the horizontal segment.

28 Claims, 12 Drawing Sheets

(51) Int. Cl.
| | |
|---|---|
| *E21B 47/07* | (2012.01) |
| *E21B 47/107* | (2012.01) |
| *E21B 43/14* | (2006.01) |
| *E21B 47/06* | (2012.01) |
| *E21B 49/08* | (2006.01) |
| *G01F 23/296* | (2006.01) |
| *G01V 1/40* | (2006.01) |
| *G01V 9/02* | (2006.01) |
| *E21B 43/24* | (2006.01) |
| *E21B 43/12* | (2006.01) |
| *G01F 1/66* | (2006.01) |

(52) U.S. Cl.
CPC ........ *E21B 43/2406* (2013.01); *E21B 47/003* (2020.05); *E21B 47/06* (2013.01); *E21B 47/07* (2020.05); *E21B 47/107* (2020.05); *E21B 49/08* (2013.01); *G01F 1/662* (2013.01); *G01F 23/296* (2013.01); *G01V 1/40* (2013.01); *G01V 9/02* (2013.01); *E21B 43/121* (2013.01)

(58) Field of Classification Search
CPC ...... E21B 47/07; E21B 47/107; E21B 43/122; E21B 43/14; E21B 47/06; E21B 49/08; E21B 43/2406; E21B 43/121
See application file for complete search history.

(56) References Cited

OTHER PUBLICATIONS

CanePT™ Optical Pressure and Temperature Sensor, available from Weatherford International, retrieved from the internet on Sep. 27, 2018 at: https://www.weatherford.com/en/documents/real-result/completions/reservoir-monitoring/canept%e2%84%a2-optical-p-t-gauges-operate-continuously-in-7-hpht.-deepwater-wells-with-zero-failures-to-dat/; 1 page.

* cited by examiner

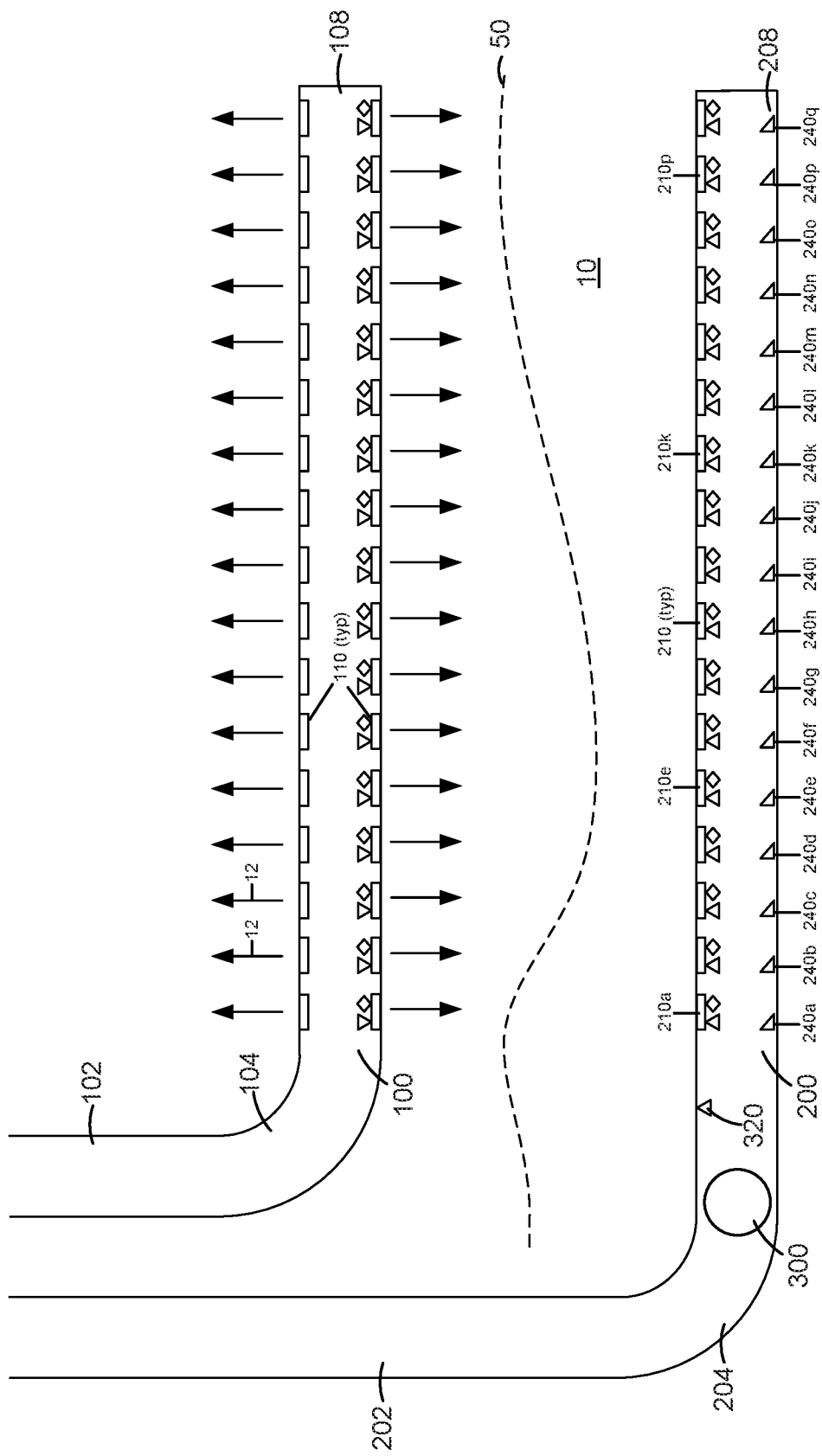

SYSTEMS AND METHODS FOR DYNAMIC LIQUID LEVEL MONITORING AND CONTROL

CROSS-REFERENCE TO RELATED APPLICATION

This application claims priority from Canadian Patent Application 2,983,541 filed Oct. 24, 2017 entitled SYSTEMS AND METHODS FOR DYNAMIC LIQUID LEVEL MONITORING AND CONTROL, and Canadian Patent Application 3,020,827 filed Oct. 15, 2018 entitled SYSTEMS AND METHODS FOR ESTIMATING AND CONTROLLING LIQUID LEVEL USING PERIODIC SHUT-INS, the entirety of which are incorporated by reference herein.

FIELD

This disclosure relates generally to monitoring liquid levels during petroleum extraction, and more specifically to systems and methods for utilizing distributed pressure and temperature measurements to determine the thermodynamic state of fluids along the horizontal section of a production wellbore, and to use the determined state information to calculate frictional pressure loss along the production wellbore and the liquid level in the formation above the horizontal section.

BACKGROUND

Generally speaking, gravity drainage refers to a recovery process in which gravity is the primary force used to recover heavy oil and bitumen from a reservoir. An example of a gravity drainage process is Steam Assisted Gravity Drainage (SAGD). In a typical SAGD process, two horizontal wellbores are drilled into an oil-containing reservoir. The wellbores are positioned generally parallel to each other and spaced apart vertically, with one wellbore being positioned above the other wellbore, typically by about 4 to 6 meters. During production, high pressure steam is injected into the upper wellbore (also referred to as the injector) to heat the oil in the surrounding formation, thereby reducing its viscosity such that it can flow through the formation under the force of gravity. The heated oil—along with any condensed steam (i.e. water)—drains into the lower wellbore (also referred to as the producer), and the collected oil and water are pumped to the surface.

Solvent Assisted—Steam Assisted Gravity Drainage (SA-SAGD) and Vapor Assisted Petroleum Extraction (VAPEX) are examples of other gravity drainage recovery processes for producing heavy oil. SA-SAGD and VAPEX are similar to SAGD, but instead of (or in addition to) steam, one or more vaporized solvents (e.g. ethane, propane) are injected to reduce the viscosity of oil in the surrounding formation.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one broad aspect of this disclosure, there is provided a system for determining a liquid level in a formation above a horizontal segment of a wellbore, the system comprising: at least one temperature sensor positioned in the wellbore segment to measure a local temperature for each of a plurality of inflow zones between a heel and a toe of the wellbore segment; at least one pressure sensor positioned in the wellbore segment to measure a local pressure for each of the plurality of inflow zones; at least one flow rate sensor to measure a total flowrate for fluids exiting the wellbore segment via the wellbore; and one or more processors operatively coupled to the at least one temperature sensor, the at least one pressure sensor, and the flow rate sensor, the one or more processors, collectively, configured to: determine local temperatures for each of the plurality of inflow zones using the at least one temperature sensor; determine local pressures for each of the plurality of inflow zones using the at least one pressure sensor; determine the total flowrate for fluids exiting the wellbore segment via the wellbore using the at least one flow rate sensor; for each of the plurality of inflow zones: determine a local inflow rate for fluids entering the wellbore segment from the formation for that inflow zone, based on the local temperature and the local pressure determined for that inflow zone, the local temperature and the local pressure determined for at least one other inflow zone, and at least one value based on a composition of the fluids entering the wellbore segment from the formation at that inflow zone, and for at least one of the plurality of inflow zones: determine a local reservoir pressure for a location in the formation above that inflow zone, based on the local inflow rate, the local temperature, and the local pressure for that inflow zone, and determine a local liquid level, based on the local reservoir pressure and a pressure associated with an injector wellbore positioned above the wellbore segment.

In some embodiments, the at least one temperature sensor comprises a thermocouple or a set of thermocouples.

In some embodiments, the at least one temperature sensor comprises a distributed temperature sensor (DTS).

In some embodiments, the at least one pressure sensor comprises a distributed pressure sensing system.

In some embodiments, the at least one pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones by interpolation using pressures from discrete pressure sensors positioned in other inflow zones.

In some embodiments, the one or more processors are further configured to, when determining, for each of the plurality of inflow zones, a local inflow rate for fluids entering the wellbore segment from the formation for that inflow zone: determine a local incoming flow rate for fluids flowing from a portion of the wellbore segment located upstream of that inflow zone, based on the local temperature and the local pressure at that inflow zone, the at least one value based on a composition of the fluids entering the wellbore segment from the formation at that inflow zone, and the local temperature and the local pressure for an inflow zone upstream of that location; determine a local outgoing flow rate for fluids flowing to a portion of the wellbore segment located downstream of that inflow zone, based on the local temperature and the local pressure at that inflow zone, the at least one value based on a composition of the fluids entering the wellbore segment from the formation at that inflow zone, and the local temperature and the local pressure for an inflow zone downstream of that location; wherein the local incoming flow rate and the local outgoing flow rate are determined using a multiphase flow model; and determine the local inflow rate based on a difference between the local incoming flow rate and the local outgoing flow rate and a mass/energy balance.

In some embodiments, the one or more processors are further configured to, when determining, for each of the plurality of inflow zones, a local inflow rate for fluids entering the wellbore segment from the formation for that inflow zone: initially determine the local inflow rate for either the inflow zone of the plurality of inflow zones located closest to the toe of the wellbore segment or the inflow zone of the plurality of inflow zones closest to the heel of the wellbore segment, and subsequently determining the local inflow rates sequentially for each of the remaining inflow zones in the plurality of inflow zones.

In some embodiments, the one or more processors are further configured to, when determining, for each of the plurality of inflow zones, a local inflow rate for fluids entering the wellbore segment from the formation for that inflow zone: initially determine the local inflow rate for each inflow zone of the plurality of inflow zones, and, in response to determining that at least one of the local inflow rates is non-negative, varying the at least one value based on a composition of the fluids entering the wellbore from the formation for at least one inflow zone, and subsequently re-determining a local inflow rate for each inflow zone in the plurality of inflow zones.

In some embodiments, the one or more processors are further configured to, when determining, for each of the plurality of inflow zones, a local inflow rate for fluids entering the wellbore segment from the formation for that inflow zone: determine a local phase split for fluids entering the wellbore segment from the formation for that inflow zone, based on the local inflow rate, the local temperature, and the local pressure for that location.

In some embodiments, the plurality of inflow zones comprises at least five inflow zones.

In some embodiments, the system further comprises a display device operatively coupled to the one or more processors, and wherein the one or more processors are further configured to cause the display device to display a graphical representation of the determined local liquid levels for the at least one of the plurality of inflow zones.

In some embodiments, the graphical representation of the determined local liquid levels for the at least one of the plurality of inflow zones comprises a representation of local liquid levels for at least ten percent of a length between the heel and the toe of the wellbore segment.

In accordance with another broad aspect, there is provided a method for determining a liquid level in a formation above a horizontal segment of a wellbore, the method comprising: measuring, using at least one temperature sensor positioned in the wellbore segment, a local temperature for each of a plurality of inflow zones between a heel and a toe of the wellbore segment; measuring, using at least one pressure sensor positioned in the wellbore segment, a local pressure for each of the plurality of inflow zones; measuring a total flowrate for fluids exiting the wellbore segment; determining, for each of the plurality of inflow zones: a local inflow rate for fluids entering the wellbore segment from the formation for that inflow zone, and determining, for at least one of the plurality of inflow zones: a local reservoir pressure for a location in the formation above that inflow zone, based on the local inflow rate, the local temperature, and the local pressure for that inflow zone, and a local liquid level, based on the local reservoir pressure and a pressure associated with an injector wellbore positioned above the wellbore segment.

In some embodiments, for each of the plurality of inflow zones, a local inflow rate for fluids entering the wellbore segment from the formation for that inflow zone is determined based on the local temperature and the local pressure at that inflow zone, the local temperature and the local pressure for at least one other inflow zone, and at least one value based on a composition of the fluids entering the wellbore from the formation at that inflow zone.

In some embodiments, determining, for each of the plurality of inflow zones, a local inflow rate for fluids entering the wellbore segment from the formation for that inflow zone further comprises: comparing the total flowrate for fluids exiting the wellbore segment to a sum of the local inflow rates for each of the plurality of inflow zones; and in response to the total flowrate and the sum of the local inflow rates differing by a predetermined amount: updating the at least one value based on a composition of the fluids entering the wellbore segment from the formation for at least one inflow zone, and re-determining, for each of the plurality of inflow zones, the local inflow rate for fluids entering the wellbore segment from the formation at that inflow zone.

In some embodiments, the method further comprises: measuring, using at least one acoustic sensor positioned in the wellbore segment, a local acoustic signal for each of the plurality of inflow zones, and wherein determining, for each of the plurality of inflow zones, a local inflow rate for fluids entering the wellbore segment from the formation for that inflow zone further comprises comparing the local acoustic signal for that inflow zone to the local acoustic signals for each of the plurality of inflow zones and to the total flowrate for fluids exiting the wellbore segment.

In some embodiments, the method further comprises: after determining the local liquid level for at least one of the plurality of inflow zones at a first time: re-determining the local liquid level for at least one of the plurality of inflow zones at a second time; comparing the determined local liquid level for at least one of the plurality of inflow zones at the first time and at the second time; in response to the determined local liquid level for at least one of the plurality of inflow zones at the second time being greater than the determined local liquid level for at least one of the plurality of inflow zones at the first time, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and in response to the determined local liquid level for at least one of the plurality of inflow zones at the first time being greater than the determined local liquid level for at least one of the plurality of inflow zones at the second time, performing at least one of: decreasing the pump rate of the artificial lift device to decrease the total flowrate for fluids exiting the wellbore segment; decreasing the open area of at least one of the plurality of inflow zones; and blocking the open area of at least one of the plurality of inflow zones.

In some embodiments, in response to the determined local liquid level for at least one of the plurality of inflow zones at the second time being greater than the determined local liquid level for at least one of the plurality of inflow zones at the first time, the method further comprises increasing an injection rate of a fluid injector to increase a total flow rate of fluids into the injector wellbore, in order to maintain pressure in a steam chamber.

In some embodiments, in response to the determined local liquid level for at least one of the plurality of inflow zones at the second time being greater than the determined local liquid level for at least one of the plurality of inflow zones at the first time, the method further comprises decreasing an injection rate of a fluid injector to decrease a total flow rate of fluids into the injector wellbore, in order to decrease a bitumen drainage rate in a steam chamber.

In some embodiments, in response to the determined local liquid level for at least one of the plurality of inflow zones at the first time being greater than the determined local liquid level for at least one of the plurality of inflow zones at the second time, the method further comprises decreasing an injection rate of a fluid injector to decrease a total flow rate of fluids into the injector wellbore, in order to maintain pressure in a steam chamber.

In some embodiments, in response to the determined local liquid level for at least one of the plurality of inflow zones at the first time being greater than the determined local liquid level for at least one of the plurality of inflow zones at the second time, the method further comprises increasing an injection rate of a fluid injector to increase a total flow rate of fluids into the injector wellbore, in order to increase a bitumen drainage rate in a steam chamber.

In some embodiments, the method further comprises: after determining the local liquid level for at least one of the plurality of inflow zones: comparing the determined local liquid level for at least one of the plurality of inflow zones to a target liquid level; in response to the determined local liquid level for at least one of the plurality of inflow zones being greater than the target liquid level, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and in response to the target liquid level being greater than the determined local liquid level for at least one of the plurality of inflow zones, performing at least one of: decreasing the pump rate of the artificial lift device to decrease the total flowrate for fluids exiting the wellbore segment; and decreasing the open area of at least one of the plurality of inflow zones; and blocking the open area of at least one of the plurality of inflow zones.

In some embodiments, in response to the determined local liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

In some embodiments, in response to the determined local liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

In some embodiments, in response to the target liquid level being greater than the determined local liquid level for at least one of the plurality of inflow zones, the method further comprises decreasing an injection rate of a fluid injector to decrease a total flow rate of fluids into the injector wellbore, in order to maintain pressure in a steam chamber.

In some embodiments, in response to the target liquid level being greater than the determined local liquid level for at least one of the plurality of inflow zones, the method further comprises increasing an injection rate of a fluid injector to increase a total flow rate of fluids into the injector wellbore, in order to increase a bitumen drainage rate in a steam chamber.

In accordance with another broad aspect, there is provided a system for determining a liquid level in a formation between a horizontal segment of an injection wellbore and a horizontal segment of a production wellbore, the system comprising: at least one first temperature sensor positioned in the injection wellbore to measure a local temperature for each of a plurality of injection zones between a heel and a toe of the injection wellbore segment; at least one first pressure sensor positioned in the injection wellbore to measure a local pressure for each of the plurality of injection zones; at least one first flow rate sensor to measure a total flowrate for fluids entering the injection wellbore segment via the injection wellbore; at least one second temperature sensor positioned in the production wellbore segment to measure a local temperature for each of a plurality of production zones between a heel and a toe of the production wellbore segment; at least one second pressure sensor positioned in the production wellbore segment to measure a local pressure for each of the plurality of production zones; at least one second flow rate sensor to measure a total flowrate for fluids exiting the production wellbore segment via the production wellbore; one or more processors operatively coupled to the at least one first temperature sensor, the at least one first pressure sensor, the first flow rate sensor, the at least one second temperature sensor, the at least second first pressure sensor, the second flow rate sensor, and a display device, the one or more processors, collectively, configured to: determine local temperatures for each of the plurality of injection zones using the at least one first temperature sensor; determine local pressures for each of the plurality of injection zones using the at least one first pressure sensor; determine the total flowrate for fluids entering the injection wellbore segment via the injection wellbore using the at least one first flow rate sensor; determine local temperatures for each of the plurality of production zones using the at least one second temperature sensor; determine local pressures for each of the plurality of production zones using the at least one second pressure sensor; determine the total flowrate for fluids exiting the production wellbore segment via the production wellbore using the at least one second flow rate sensor; for each of the plurality of injection zones: determine a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and determine a local formation pressure for a location in the formation proximate that injection zone, based on the local injection flow rate, and the local temperature and the local pressure at that injection zone; for each of the plurality of production zones: determine a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and, determine a local reservoir pressure for a location in the formation above that inflow zone, based on the local inflow rate, and the local temperature and the local pressure at that production zone; and determine, for at least one of the plurality of production zones: a local liquid level, based on the local reservoir pressure for the location in the formation above that production zone and the local formation pressure for the location in the formation proximate an injection zone horizontally aligned with that production zone.

In some embodiments, the one or more processors are further configured to cause the display device to display a graphical representation of the determined local liquid levels.

In accordance with another broad aspect, there is provided a method for determining a liquid level in a formation between a horizontal segment of an injection wellbore and a horizontal segment of a production wellbore, the method comprising: measuring, using at least one first temperature sensor positioned in the injection wellbore, a local temperature for each of a plurality of injection zones between a heel and a toe of the injection wellbore segment; measuring, using at least one first pressure sensor positioned in the injection wellbore, a local pressure for each of the plurality of injection zones; measuring a total flowrate for fluids entering the injection wellbore segment via the injection wellbore; determining, for each of the plurality of injection zones: a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and a local formation pressure for a location in the formation proximate that injection zone, based on the local injection flow rate, and the local temperature and the local pressure at that injection zone; measuring, using at least one second temperature sensor positioned in the production wellbore, a local temperature for each of a plurality of production zones between a heel and a toe of the production wellbore segment; measuring, using at least one second pressure sensor positioned in the production wellbore, a local pressure for each of the plurality of production zones; measuring a total flowrate for fluids exiting the production wellbore segment via the production wellbore; determining, for each of the plurality of production zones: a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and, a local reservoir pressure for a location in the formation above that production zone, based on the local inflow rate, and the local temperature and the local pressure at that production zone; and determining, for at least one of the plurality of production zones: a local liquid level, based on the local reservoir pressure for the location in the formation above that production zone and the local formation pressure for the location in the formation proximate an injection zone horizontally aligned with that production zone.

In some embodiments, a local liquid level is determined for each of the plurality of production zones.

In some embodiments, the method further comprises: after determining the local liquid level for at least one of the plurality of production zones at a first time: re-determining the local liquid level for at least one of the plurality of production zones at a second time; comparing the determined local liquid level for at least one of the plurality of production zones at the first time and at the second time; in response to the determined local liquid level for at least one of the plurality of production zones at the second time being greater than the determined local liquid level for at least one of the plurality of production zones at the first time, performing at least one of: increasing a pump rate of an artificial lift device to increase the total flowrate for fluids exiting the production wellbore segment; increasing an open area of at least one of the plurality of inflow zones; and unblocking the open area of at least one of the plurality of inflow zones; and in response to the determined local liquid level for at least one of the plurality of production zones at the first time being greater than the determined local liquid level for at least one of the plurality of production zones at the second time, performing at least one of: decreasing the pump rate of the artificial lift device to decrease the total flowrate for fluids exiting the production wellbore segment; decreasing the open area of at least one of the plurality of inflow zones; and blocking the open area of at least one of the plurality of inflow zones.

In some embodiments, in response to the determined local liquid level for at least one of the plurality of inflow zones at the second time being greater than the determined local liquid level for at least one of the plurality of inflow zones at the first time, the method further comprises increasing an injection rate of a fluid injector to increase a total flow rate of fluids into the injector wellbore, in order to maintain pressure in a steam chamber.

In some embodiments, in response to the determined local liquid level for at least one of the plurality of inflow zones at the second time being greater than the determined local liquid level for at least one of the plurality of inflow zones at the first time, the method further comprises decreasing an injection rate of a fluid injector to decrease a total flow rate of fluids into the injector wellbore, in order to decrease a bitumen drainage rate in a steam chamber.

In some embodiments, in response to the determined local liquid level for at least one of the plurality of inflow zones at the first time being greater than the determined local liquid level for at least one of the plurality of inflow zones at the second time, the method further comprises decreasing an injection rate of a fluid injector to decrease a total flow rate of fluids into the injector wellbore, in order to maintain pressure in a steam chamber.

In some embodiments, in response to the determined local liquid level for at least one of the plurality of inflow zones at the first time being greater than the determined local liquid level for at least one of the plurality of inflow zones at the second time, the method further comprises increasing an injection rate of a fluid injector to increase a total flow rate of fluids into the injector wellbore, in order to increase a bitumen drainage rate in a steam chamber.

In some embodiments, the method further comprises: after determining the local liquid level for at least one of the plurality of production zones: comparing the determined local liquid level for at least one of the plurality of production zones to a target liquid level; in response to the determined local liquid level for at least one of the plurality of production zones being greater than the target liquid level, performing at least one of: increasing a pump rate of an artificial lift device to increase the total flowrate for fluids exiting the production wellbore segment; increasing an open area of at least one of the plurality of inflow zones; and unblocking the open area of at least one of the plurality of inflow zones; and in response to the target liquid level being greater than the determined local liquid level for at least one of the plurality of production zones, performing at least one of: decreasing the pump rate of the artificial lift device to decrease the total flowrate for fluids exiting the production wellbore segment; decreasing the open area of at least one of the plurality of inflow zones; and blocking the open area of at least one of the plurality of inflow zones.

In some embodiments, in response to the determined local liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

In some embodiments, in response to the determined local liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

In some embodiments, in response to the target liquid level being greater than the determined local liquid level for at least one of the plurality of inflow zones, the method further comprises decreasing an injection rate of a fluid injector to decrease a total flow rate of fluids into the injector wellbore, in order to maintain pressure in a steam chamber.

In some embodiments, in response to the target liquid level being greater than the determined local liquid level for at least one of the plurality of inflow zones, the method further comprises increasing an injection rate of a fluid injector to increase a total flow rate of fluids into the injector wellbore, in order to increase a bitumen drainage rate in a steam chamber.

In accordance with another broad aspect, there is provided a system for determining a liquid level in a formation above a horizontal segment of a wellbore, the system comprising: at least one temperature sensor positioned in the wellbore segment to measure a local temperature for each of a plurality of inflow zones between a heel and a toe of the wellbore segment; at least one pressure sensor positioned in the wellbore segment to measure a local pressure for each of the plurality of inflow zones; at least one first flow rate sensor to measure a total flowrate for fluids exiting the wellbore segment via the wellbore; at least one acoustic sensor positioned in the wellbore segment to measure a local acoustic signal for each of the plurality of inflow zones; and one or more processors operatively coupled to the at least one temperature sensor, the at least one pressure sensor, the at least one first flow rate sensor, and the acoustic sensor, the one or more processors, collectively, configured to: determine local temperatures for each of the plurality of inflow zones using the at least one temperature sensor; determine local pressures for each of the plurality of inflow zones using the at least one pressure sensor; determine the total flowrate for fluids exiting the wellbore segment via the wellbore using the at least one flow rate sensor; determine local acoustic signals for each of the plurality of inflow zones using the at least one acoustic sensor; for each of the plurality of inflow zones: determine a local inflow rate for fluids entering the wellbore segment from the formation for that inflow zone, based on the local acoustic signal determined for that inflow zone and the total flowrate for fluids exiting the wellbore segment, and for at least one of the plurality of inflow zones: determine a local reservoir pressure for a location in the formation above that inflow zone, based on the local inflow rate, the local temperature and the local pressure for that inflow zone, and at least one value based on a composition of the fluids entering the wellbore segment from the formation at that inflow zone, and determine a local liquid level, based on the local reservoir pressure and a pressure associated with an injector wellbore positioned above the wellbore segment.

In some embodiments, the at least one temperature sensor comprises a thermocouple or a set of thermocouples.

In some embodiments, the at least one temperature sensor comprises a distributed temperature sensor (DTS).

In some embodiments, the at least one pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones by interpolation using pressures from discrete pressure sensors positioned in other inflow zones.

In some embodiments, the at least one acoustic sensor comprises a distributed acoustic sensor (DAS).

In some embodiments, the one or more processors are further configured to, when determining, for each of the plurality of inflow zones, a local inflow rate for fluids entering the wellbore segment from the formation for that inflow zone: determine a local phase split for fluids entering the wellbore segment from the formation for that inflow zone, based on the local inflow rate, the local temperature, and the local pressure for that location.

In some embodiments, the system further comprises a display device operatively coupled to the one or more processors, and wherein the one or more processors are further configured to cause the display device to display a graphical representation of the determined local liquid levels.

In some embodiments, the graphical representation of the determined local liquid levels comprises a representation of local liquid levels for at least ten percent of a length between the heel and the toe of the wellbore segment It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 12 is a schematic longitudinal cross-section view of a pair of horizontal wellbores in accordance with another example embodiment.

Figure 1:
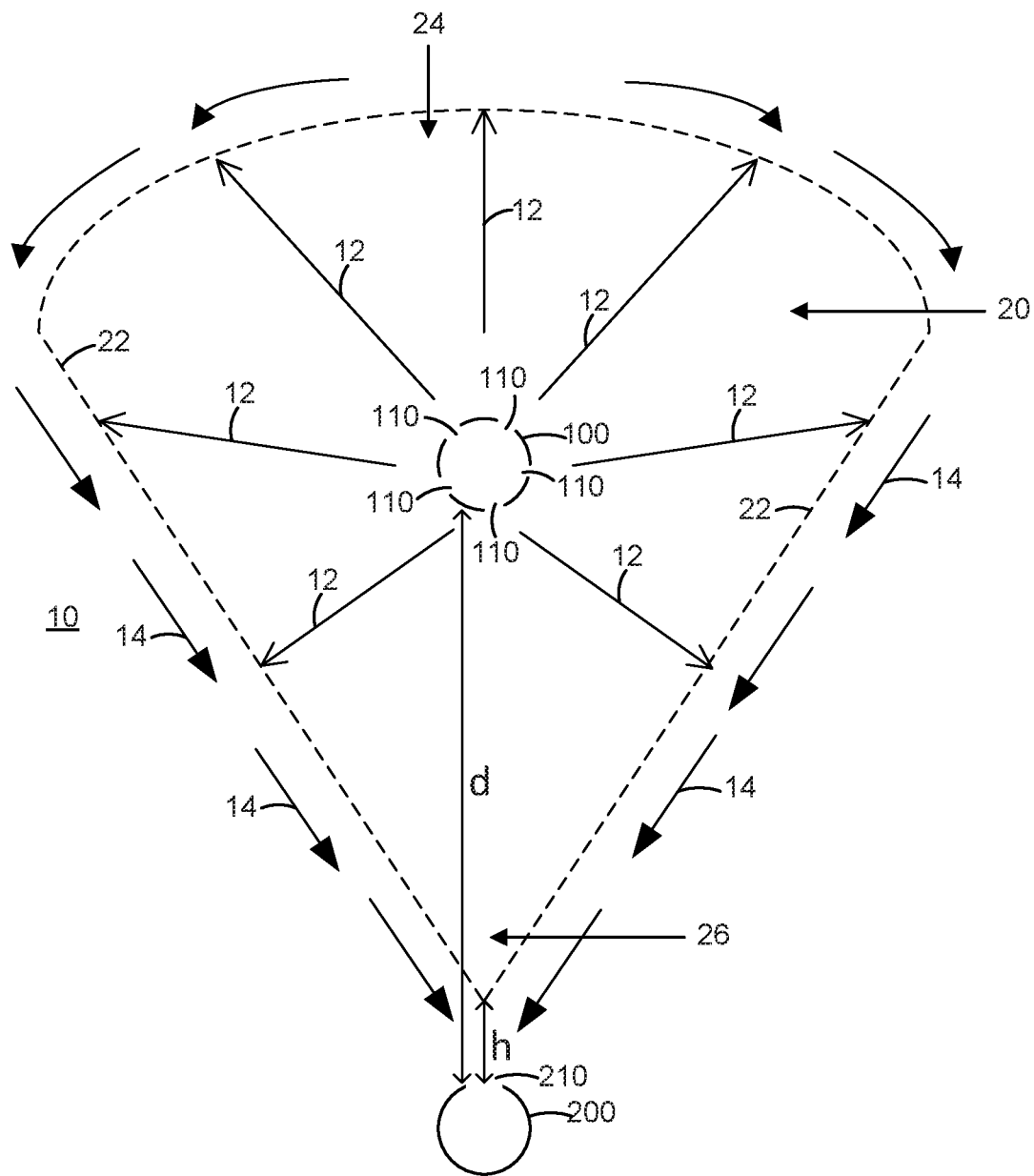
FIG. 1 is a schematic axial cross-section view of a pair of horizontal wellbores through a formation being used in a typical gravity drainage recovery process.

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

FIG. 1 illustrates a schematic axial cross-section of a typical SAGD recovery process. A pair of parallel horizontal wellbore segments 100, 200 are provided in a formation or reservoir 10 and are spaced apart vertically by a distance d. Steam is pumped down from the surface and along the upper wellbore 100, where it passes into the formation 10 via one of a number of apertures 110 (e.g. screens, perforations) provided in the wellbore casing. Upper wellbore 100 may also be referred to as an injector wellbore or simply an injector. As steam is injected, thermal energy from the steam is transferred to the formation. This thermal energy increases the temperature of petroleum products present in the formation (e.g. heavy crude oil or bitumen), which reduces their viscosity and allows them to flow downwards under the influence of gravity towards the lower wellbore 200, where it passes into the wellbore 200 via one of a number of apertures 210 (e.g. screens, perforations) provided in the wellbore casing. Lower wellbore 200 may also be referred to as a producer wellbore or simply a producer.

As the steam initially enters the reservoir, a 'steam chamber' 20 is formed. The boundary or wall 22 of the steam chamber represents a boundary between fluids in a gaseous state (including injected steam—as indicated by arrows 12—and any gasses present in the formation) and fluids in a liquid state (including heavy crude oil or bitumen and condensed steam). As steam injection continues, thermal energy is released from the steam as it condenses against the wall 22 of the steam chamber. Heated petroleum products and condensate (as indicated by arrows 14) flow along or adjacent to the wall 22, and down into producer wellbore 200. Within the steam chamber, fluids in a gaseous state tend to rise towards the top of the chamber 24 due to their relatively low density, while liquids tend to collect at the bottom of the steam chamber 26. In the illustrated example, the liquid level at the bottom of the steam chamber is a distance h above the producer wellbore 200.

While during normal operation lower wellbore 200 acts as a producer (i.e. fluid is extracted from the formation via wellbore 200), it will be appreciated that wellbore 200 may alternately act as an injector. For example, during start-up of an SAGD process steam may be pumped into both wellbores 100 and 200 to initially heat the formation proximate both the upper and lower wellbores, following which wellbore 200 may be transitioned to a producer by discontinuing the steam flow into this wellbore.

Figure 2:
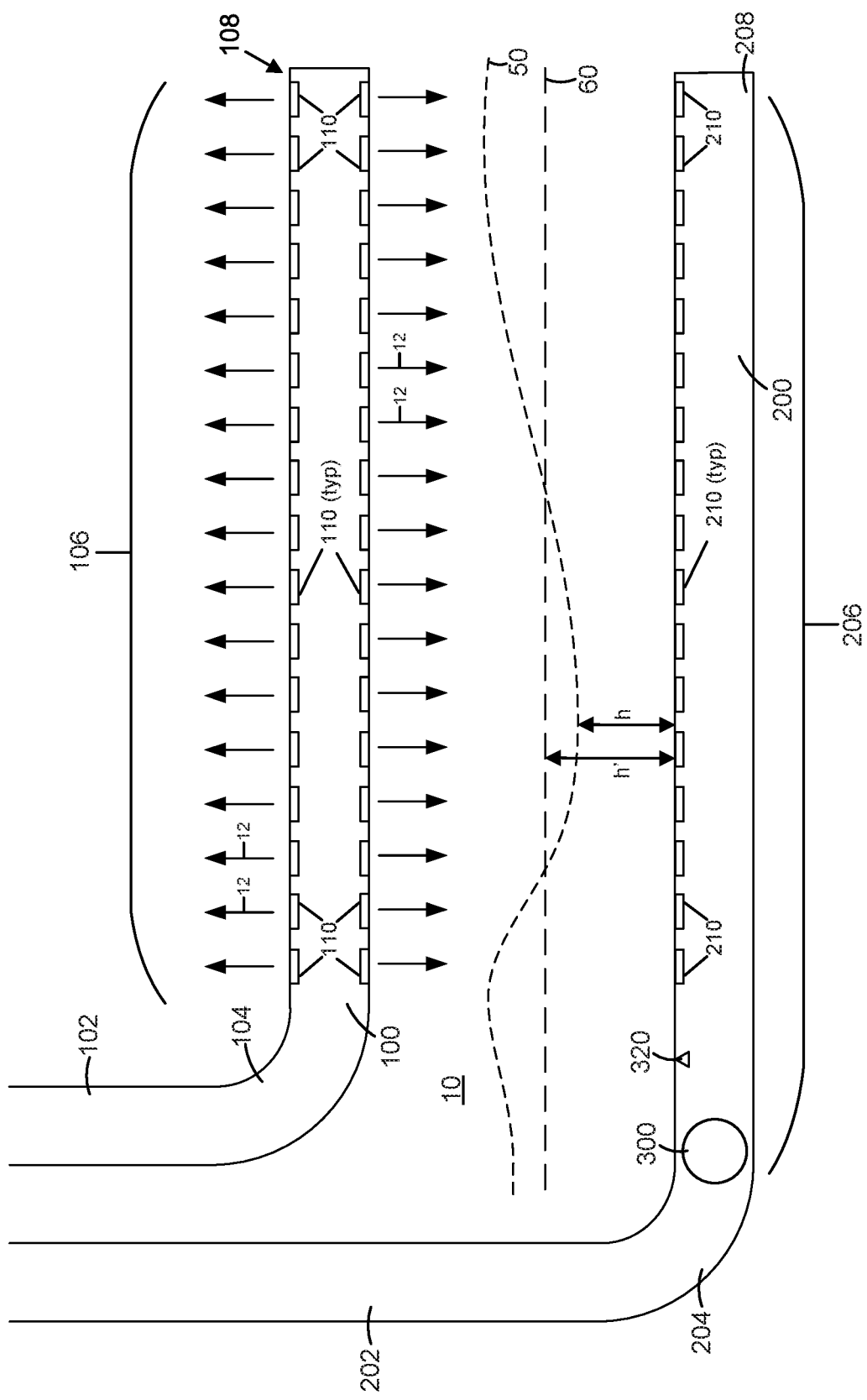
FIG. 2 is a schematic longitudinal cross-section view of the horizontal wellbores of FIG. 1, with a first liquid level and a first estimated liquid level.

FIG. 2 illustrates a schematic longitudinal cross-section of a typical SAGD recovery process. Steam is pumped down from the surface through the vertical section 102 and the heel 104 of the injector wellbore 100, and along the horizontal segment 106 towards the toe 108. A number of outflow locations 110 (e.g. screens, perforations, or other apertures) are provided along the injector wellbore casing to allow the steam to access the formation. Heated petroleum products and condensate from the injected fluids flow down through the formation 10 and into producer wellbore 200 through one of a number of inflow locations 210 (e.g. screens, perforations, or other apertures) provided along the horizontal segment 206 of the producer wellbore casing between the heel 204 of the producer wellbore and the toe 208. One or more artificial lift devices 300 (e.g. electrical submersible pumps) is used to pump fluids collected along the horizontal segment 206 of the producer wellbore 200 up to the surface through the vertical section 202.

In the illustrated example, the line 50 represents the fluid level h of the steam chamber between the wellbores along their horizontal segments. As shown, the fluid level h typically varies along the length of the horizontal wellbore segment due to local differences in one or more parameters, such as porosity of the formation, temperature and pressure levels, composition of petroleum products, etc.

In the example illustrated in FIG. 2, the liquid level h is above the producer wellbore at all points along the horizontal segment 206. Accordingly, the fluids entering the producer wellbore through apertures 210 are in their liquid phase. This is typically considered to be a preferable operating condition, as artificial lift devices (e.g. a rod pump or an electric submersible pump) are generally much more efficient when pumping liquids than when pumping a mix of liquid and gas. For example, pumping fluids in a gas phase may be less efficient than pumping liquids, resulting in increased energy expenditures to extract the fluids to the surface. Also, pumping gasses may lead to increased wear and/or maintenance requirements for the lift device, and may result in a reduced operating lifespan.

In a typical SAGD process, the liquid level h is approximated by comparing the temperature of the injected steam (e.g. the saturation temperature or boiling point of water at the operating pressure of the injector) to the temperature of the fluids exiting the horizontal segment of the producer wellbore 206. For example, a temperature sensor 320 may be provided proximate the heel 204 of the wellbore 200 and/or proximate the artificial lift device 300 to obtain a temperature value for the fluids being produced. The difference between these temperatures is often referred to as the 'subcool'. (It will be appreciated that the term 'subcool' may have one or more alternative definitions, and may be used in other contexts to refer to similar, or unrelated, concepts. For example, some operators may determine a distributed temperature and define a 'reservoir subcool' as the local difference between the reservoir temperature and the distributed temperature.) A higher subcool (i.e. a greater difference in injection and production temperatures) is considered indicative of a higher liquid level in the formation, while a lower subcool is considered indicative of a lower liquid level. Put another way, the subcool is used as a proxy for the liquid level. In FIG. 2, line 60 illustrates an example approximation of a liquid level h' based on the subcool.

If the subcool is low, indicating a lower liquid level, the pump rate of the artificial lift device 300 may be reduced to decrease the flow rate out of the horizontal segment. Reducing the pump rate may also result in increased pressure along the horizontal segment 206 of the producer wellbore 200 as a result of increasing liquid level in the reservoir and reduced frictional pressure drop within the well. A reduction in flowrate and/or increase in pressure for the producer can be expected to result in an increased liquid level in the formation, and accordingly a reduced risk of steam coning.

Conversely, if the subcool is high, this may result in an increased potential to 'flood' the injector wellbore. Also, a higher subcool (and the attendant higher liquid level) may indicate a less than optimum production rate. Also, a high subcool may result in reduced production, as fluids (e.g. heavy oil or bitumen) entering the producer at lower temperatures would be expected to have a higher viscosity and lower mobility. Accordingly, if the subcool is high the pump rate of the artificial lift device 300 may be increased to increase the flow rate out of the horizontal segment, and/or to reduce the pressure along the horizontal segment 206 of the producer wellbore 200. An increase in flowrate and/or decreased in pressure for the producer can be expected to increase production from the formation, which may be desirable given a reduced risk of steam coning due to the relatively high liquid level.

While the subcool can be used to approximate the liquid level, this estimation may have one or more limitations. For example, the single temperature value for the fluids being produced is an average temperature for fluids along the entire wellbore segment, and therefore may fail to capture local temperature variations. Thus, the liquid level is assumed to be approximately constant along the entire length of the horizontal segment. This can make it difficult to detect steam coning or other undesirable conditions.

Figure 3:
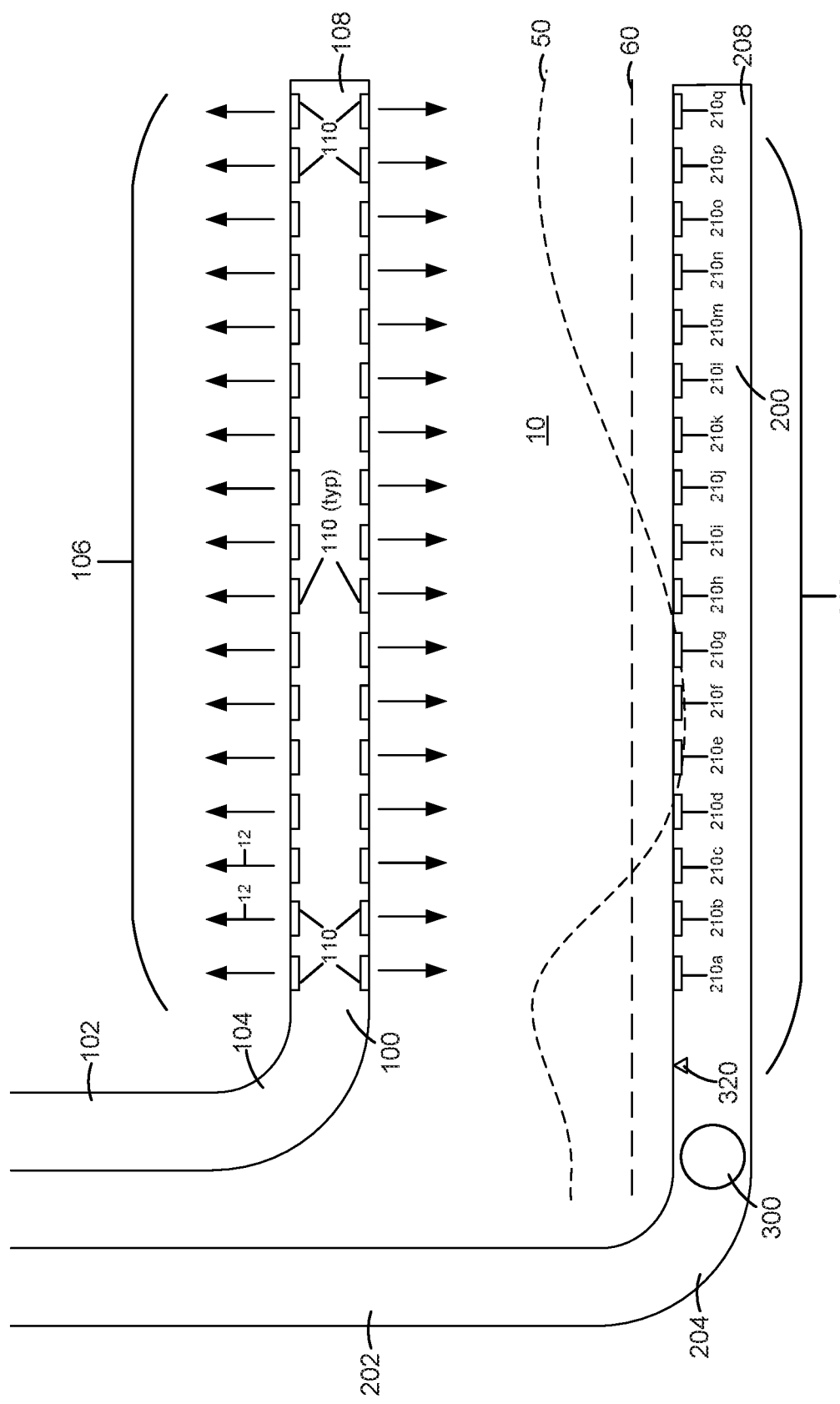
FIG. 3 is the schematic longitudinal cross-section view of FIG. 2, with a second liquid level and a second estimated liquid level.

For example, FIG. 3 illustrates another schematic longitudinal cross-section of a SAGD recovery process. In this example, the liquid level h is above the producer wellbore at inflow locations $210_a$-$210_d$ and $210_h$-$210_q$ along the horizontal segment 206, but it is below the producer wellbore at inflow locations $210_c$-$210_g$. Accordingly, while fluids entering the producer wellbore at inflow locations $210_a$-$210_d$ and $210_h$-$210_q$ are in their liquid phase, at least some of the fluids entering the producer wellbore at inflow locations $210_c$-$210_g$ are in a gaseous phase. In other words, some of the steam injected from the injector wellbore effectively 'short circuits' through the formation and passes into the producer. This situation may be characterized as 'steam coning', and is typically considered to be a less preferable operating condition. For example, as a result of this steam 'bypass', less thermal energy may be transferred to the formation.

In the example illustrated in FIG. 3, fluid entering the producer at inflow locations $210_c$-$210_g$ will comingle with fluid entering the producer at inflow locations $210_a$-$210_d$ and $210_h$-$210_q$ before a temperature is sensed by the temperature sensor 320. This comingling may mute any local temperature variance, as the temperature sensor 320 only detects an average temperature of the producer fluid. Accordingly, local inflow temperatures indicative of steam coning may not be detected based on the subcool. Instead, steam coning may be detected based on an increase in the percentage of water (or other injected fluids) in the produced fluids, e.g. when sampled at the surface. Alternatively, steam coning may be detected when the inflow to the artificial lift device 300 contains fluids in both liquid and gaseous phases, e.g. as indicated by the pump registering a fault condition. Alternatively, thermocouples or DTS fiber may provide direct detection methods for steam coning, as a local temperature value above a predetermined threshold may be indicative of steam coning at that location (although knowing a location of steam coning typically does not provide sufficient information to predict a liquid level away from the coning point). Each of these detection methods may be characterized as reactive detection, in that steam coning is only detected after it has occurred.

Figure 4:
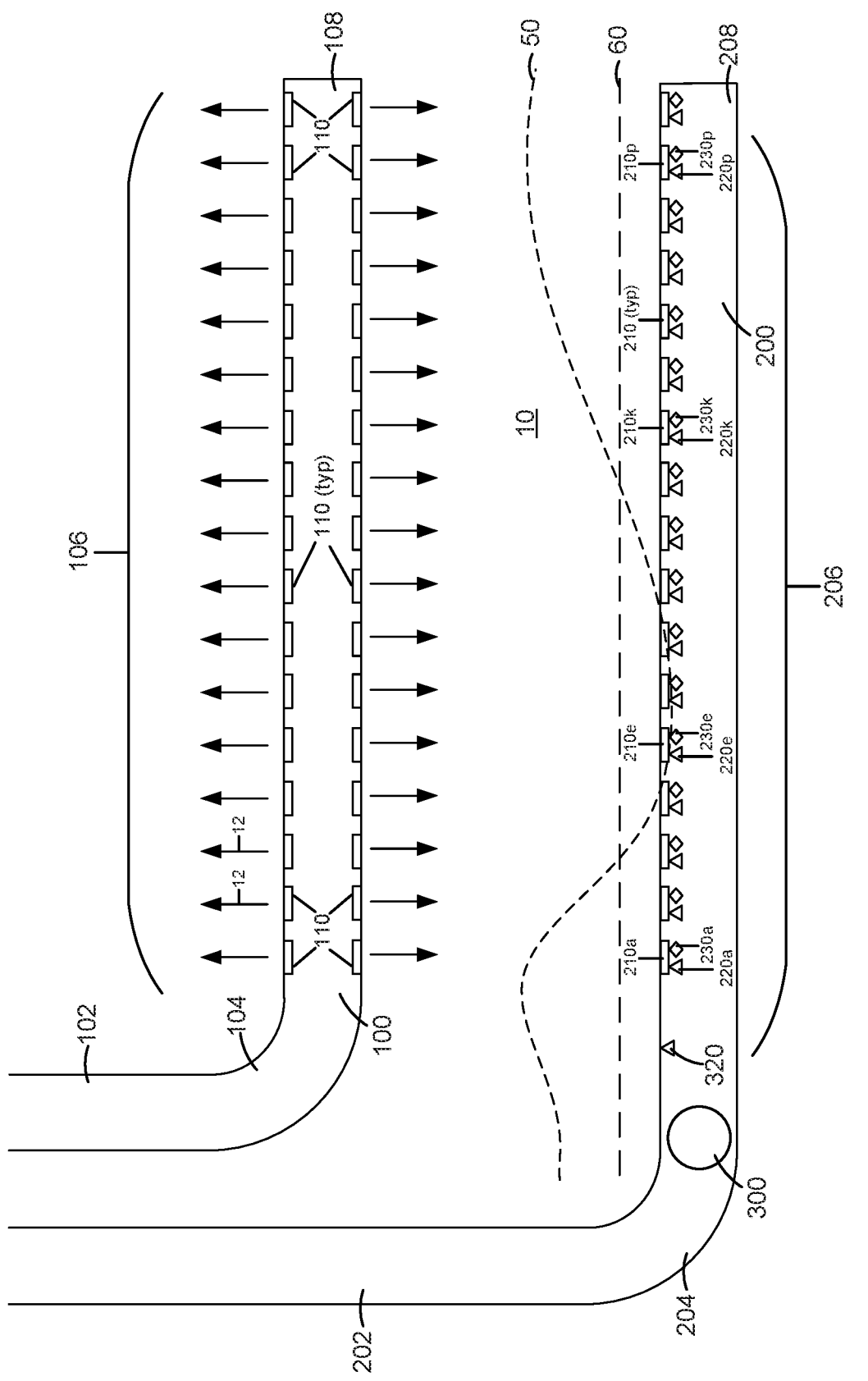
FIG. 4 is a schematic longitudinal cross-section view of a pair of horizontal wellbores in accordance with one example embodiment.

FIG. 4 illustrates a schematic longitudinal cross-section of a pair of horizontal wellbores that are provided with sensors for measuring temperature and pressure at a number of inflow locations $210_a$-$210_g$ distributed along the length of the horizontal segment 206 of the producer 200. While 17 inflow locations are shown, it will be appreciated that more or fewer inflow locations may be provided in a horizontal segment 206. As discussed further below, by obtaining pressure and temperature data for a number of zones along the horizontal segment 206 of the producer wellbore, the local thermodynamic state of the fluid inside the producer wellbore may be estimated at these zones. This may allow a more accurate and/or more detailed model of the reservoir conditions surrounding the wellbores, including the liquid level h between the injector and producer, to be developed. A more accurate model of the liquid level h may allow for improved control of production during a SAGD process.

In the example illustrated in FIG. 4, each inflow location 210 to the producer has an associated temperature sensor 220. Each temperature sensor $220_a$-$220_g$ may be a discrete unit, such as a thermocouple, resistive thermal device (RTD), and the like. Alternatively, a distributed temperature sensor (DTS) may be used to obtain temperature data for each inflow location or zone $210_a$-$210_q$. For example, a sensor based on Optical Time Domain Reflectometry (OTDR) or Optical Frequency Domain Reflectometry (OFDR) may be used.

Also, in the example illustrated in FIG. 4 each inflow location 210 has an associated pressure sensor $230_a$-$230_q$. Each pressure sensor may be a discrete unit, such as a quartz-based sensor, bubble tube, electromagnetic resonating element (ERE), electrical resonating diaphragm, and the like. Alternatively, a distributed pressure sensing system incorporating one or more distributed Fiber Bragg Grating pressure sensors may be used to obtain pressure data for each inflow location $210_a$-$210_q$. Alternatively, multiple individual Fabry Perot gauges connected to the same fiber optic trunkline may be used to obtain pressure data for each inflow zone $210_a$-$210_q$. For example, a sensor system such as a SageWatch™ Subsurface Surveillance System, available from SageRider, Inc., or the like may be used.

In some examples, a distributed data acquisition system may include one or more multi-function sensors capable of obtaining both pressure and temperature data at each inflow location $210_a$-$210_q$. Accordingly, the same physical sensor apparatus may function as both a pressure sensor and as a temperature sensor to obtain pressure and temperature data for one or more locations along the wellbore. For example, sensor systems such as CT-MORE, available from Core Laboratories of Houston, Tex., or CanePT™ Optical Pressure and Temperature Sensor, available from Weatherford International, or the like may be used.

Figure 10:
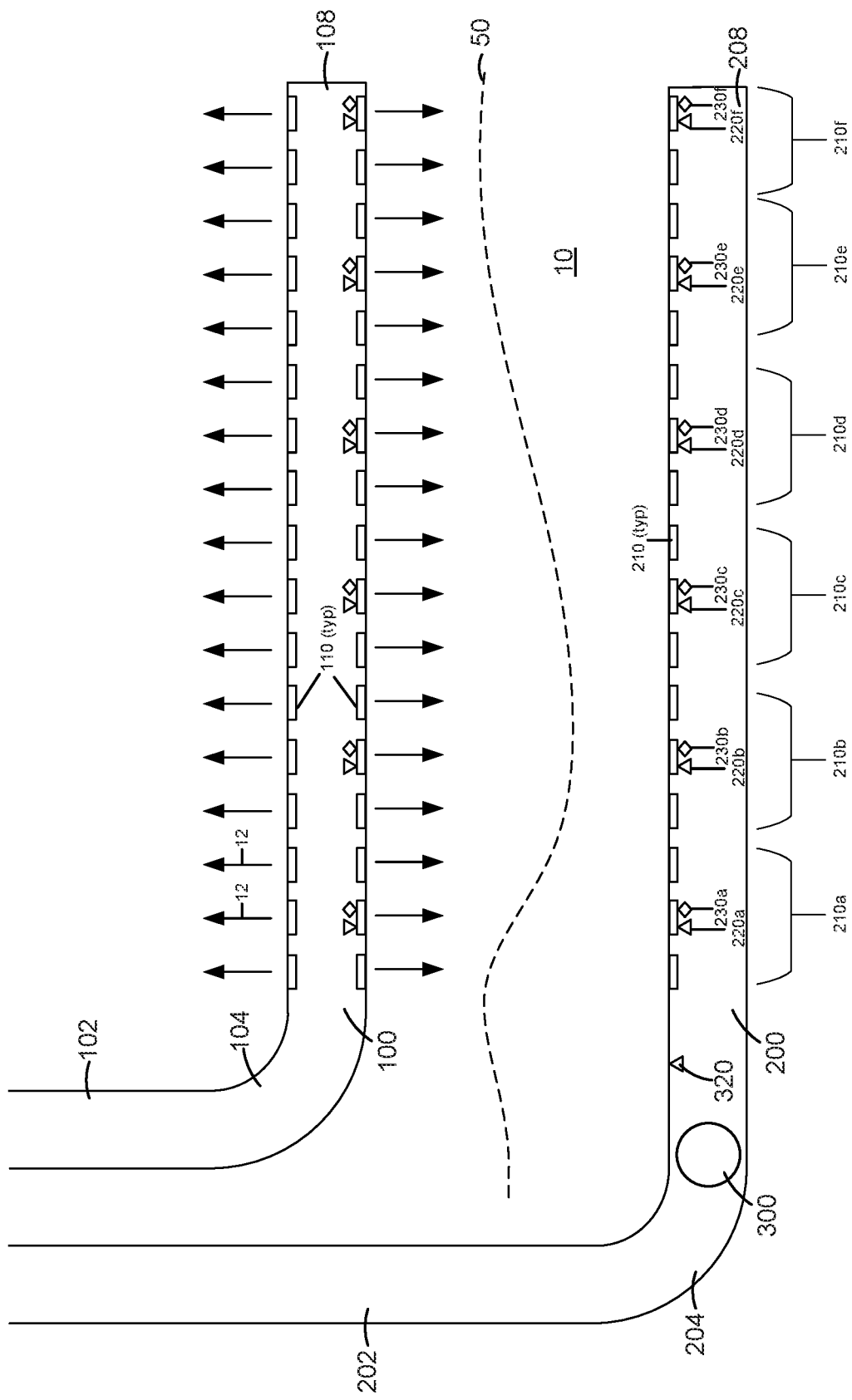
FIG. 10 is a schematic longitudinal cross-section view of a pair of horizontal wellbores in accordance with another example embodiment.

In the example illustrated in FIG. 4, each inflow location (or "inflow zone") 210 to the producer is shown with a single aperture. Alternatively, some or all of the inflow zones may include more than one discrete aperture through which fluids can enter the producer from the formation. FIG. 10 illustrates a schematic longitudinal cross-section of a pair of horizontal wellbores that are provided with sensors for measuring temperature and pressure at a number of inflow zones $210_a$-$210_f$ distributed along the length of the horizontal segment 206 of the producer 200. In the illustrated example, each inflow zone $210_a$-$210_e$ includes three apertures through which fluid can enter the producer from the formation, and inflow zone $210_f$ includes two such apertures. It will be appreciated that each zone may have more or fewer apertures.

In the example illustrated in FIG. 4, each inflow location or zone 210 to the producer is shown with an associated temperature and pressure sensor. Alternatively, one or more of the inflow zones may not include a discrete pressure sensor. For example, discrete temperature sensors (or a distributed temperature sensor) may be provided to measure local temperatures at every 1 meter or so along the production wellbore, while discrete pressure sensors (or a distributed pressure sensing system) may be provided to measure local pressure values at every 10 meters or so along the production wellbore.

Figure 11:
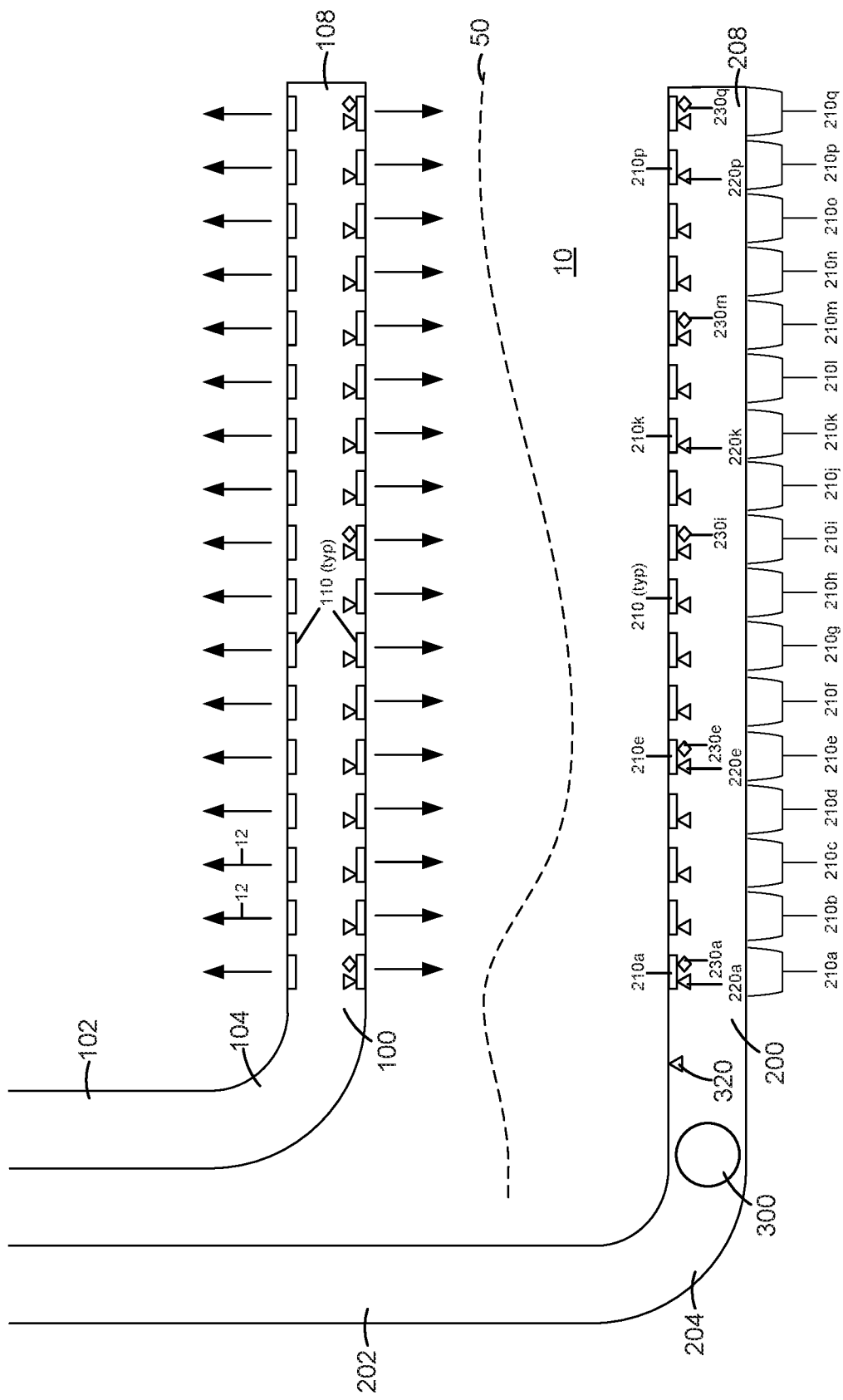
FIG. 11 is a schematic longitudinal cross-section view of a pair of horizontal wellbores in accordance with another example embodiment.

FIG. 11 illustrates a schematic longitudinal cross-section of a pair of horizontal wellbores that are provided with sensors for measuring temperature and pressure for a number of inflow zones $210_a$-$210_f$ distributed along the length of the horizontal segment 206 of the producer 200. In the illustrated example, pressure sensors 230 are provided at inflow zones $210_a$, $210_e$, $210_i$, $210_m$ and $210_q$. To determine a local pressure value for inflow zones that do not have a pressure sensor positioned therein, pressure data from sensors at one or more other inflow zones may be used. For example, a local pressure value for inflow zone $210_k$ may be determined by taking an average (weighted or unweighted) of the pressure values sensed at pressure sensors $230_i$ and $230_m$. Similarly, a local pressure for inflow zone $210_p$ may be determined by interpolating the pressure values sensed at pressure sensors $230_q$ and $230_m$. It will be appreciated that such interpolation may include any suitable mathematical model that enables infilling of values between measurements (e.g. not only linear interpolation).

By obtaining pressure and temperature data for a number of locations or zones distributed along the horizontal segment of the producer wellbore, along with a known or estimated composition of the fluid, the local thermodynamic state of the fluid may be estimated at these zones. This may allow a more accurate and/or more detailed model to be developed for the production inflow and/or reservoir conditions (e.g. liquid level) along the wellbore. A more accurate model may allow for improved control of production during a gravity drainage process (e.g. SAGD).

For example, determining the local thermodynamic state of fluid for a number of locations or zones may facilitate a more accurate estimate of the liquid level h between the injector and producer along a horizontal segment of a producer wellbore. Pressure at any given location along the producer wellbore is a function of: i) the fluid head between the injector and producer; ii) the pressure drop across the completion (including any skin effects); iii) the thermodynamic state of the fluid; iv) the frictional pressure loss along the wellbore segment between locations, which may be determined as a direct function of the vapor and liquid fractions of the fluids (which can be determined e.g. from a thermodynamic equilibrium calculation or a non-equilibrium calculation) and the flow rate through the producer wellbore; and v) while flowing, the pressure also depends on the Darcy's Law pressure drop due to the viscous effects of fluid flowing through porous media. (When the well is shut in, this viscous effect quickly drops to zero leaving only the fluid head as the only component of pressure.) It should be recognized that the fluid head is the sum of the reservoir pressure and the height of liquid above the producer. A determination of the local thermodynamic state of the fluid for a given location using pressure, temperature, and an assumed fluid composition (e.g. as obtained from a calibration of the producing well model, or obtained from sampling produced fluids during operation) may enable a more detailed and/or more accurate estimation of the liquid level above that location or zone. Also, such 'local' estimates of liquid levels may be combined to form a more detailed and/or more accurate estimate of the liquid level as it varies along the length of the producer wellbore.

An improved model of the liquid level h may facilitate an improved determination of steam breakthrough timing and location in the producer. For example, at a steam coning location (e.g. locations $210_e$-$210_g$ in FIG. 3), a local temperature increase in addition to a local pressure increase relative to other locations along the horizontal segment may confirm the possibility of steam coning. By obtaining local pressure and temperature data for such locations (e.g. using a system as illustrated in FIG. 4) to detect such local conditions, in response, surveillance engineers or other personnel may act accordingly, e.g. to choke back the flow in the producer without flooding the injector. Additionally, or alternatively, the improved model of the liquid level h may provide more direct feedback during changes to the operation of the injection well (e.g. variations in temperature, pressure, or composition of the injected fluids).

As another example, determining the local thermodynamic state of fluid for a number of locations or zones along the horizontal segment of a producer wellbore, along with a model of the frictional pressure loss along the wellbore segment between locations, may allow an improved calculation of a pressure drop between the injector wellbore and the producer wellbore, which may enable well pair operation based on liquid level control rather than based on the average subcool.

As another example, determining the local thermodynamic state of fluid for a number of locations along a horizontal segment of a producer wellbore may provide an improved estimate of gas volume fraction (including effects of produced solvent both from Solvent Assisted—Steam Assisted Gravity. Drainage (SA-SAGD) and HT-VAPEX) in the producer wellbore, which may facilitate more efficient electrical submersible pump (ESP) operation, and/or facilitate operation of an ESP with reduced maintenance.

For example, the gas volume fraction at the pump inlet may be an important consideration. To determine the gas volume fraction at this location, only the thermodynamic state and the total fluid flow at the heel (i.e. adjacent to and upstream of the pump inlet) are important. Additionally, or alternatively, an estimation of the distributed gas volume fractions along the producer wellbore may enable the control of heel/toe steam rates to minimize producer gas production, and thus minimize gas volumes at the pump inlet. Additionally, or alternatively, an estimation of the distributed gas volume fractions along the producer wellbore may assist in the avoidance of condensation induced water hammer resulting in liner and wellhead failures.

More accurate and/or more detailed state and inflow determinations may also provide an improved understanding of the liquid level during shut down and startup transients (e.g. following transition from injection to production in the lower well).

Obtaining pressure data for a number of locations or zones along a horizontal segment of a producer wellbore may also facilitate the identification of localized skin buildup on a screen or perforation at in inflow location or zone. Also, this distributed pressure data may allow for a more detailed calibration of a producing well model, and (along with the local thermodynamic state determinations) an improved understanding of the inflow distribution along the horizontal segment of the producer.

A more accurate and/or more detailed model for the production inflow and/or reservoir conditions along the wellbore may also facilitate faster identification and/or responses to system changes, which may have one or more advantages. For example, improved responses to system changes may allow for a more efficient use of steam or other injected fluids. Improved responses to system changes may also allow for improved run life for an ESP or other artificial lift device. Improved responses to system changes may also allow for lower temperature operations near inflow locations, which may improve the expected operating life of producer screens, as these screens may be 'burnt through' or otherwise damaged by prolonged exposure to direct steam production (e.g. if exposed to injector fluids that pass through the formation during 'steam coning')

The local thermodynamic state of fluid for each location or zone along the producer wellbore can be estimated using local pressure and temperature data, an assumed fluid composition (e.g. as obtained from a calibration of the producing well model, or obtained from sampling produced fluids during operation), and, for multi-component fluids, a determined phase split (which may be determined e.g. from a thermodynamic equilibrium calculation or a non-equilibrium calculation). Frictional pressure loss along the producer wellbore segment through each location or zone may be determined based on the local thermodynamic state, the local inflow rate from the formation to the producer wellbore segment, a multiphase flow model, and a flow model of the reservoir to determine the Darcy's law pressure drop due to flow in the reservoir.

Figure 5:
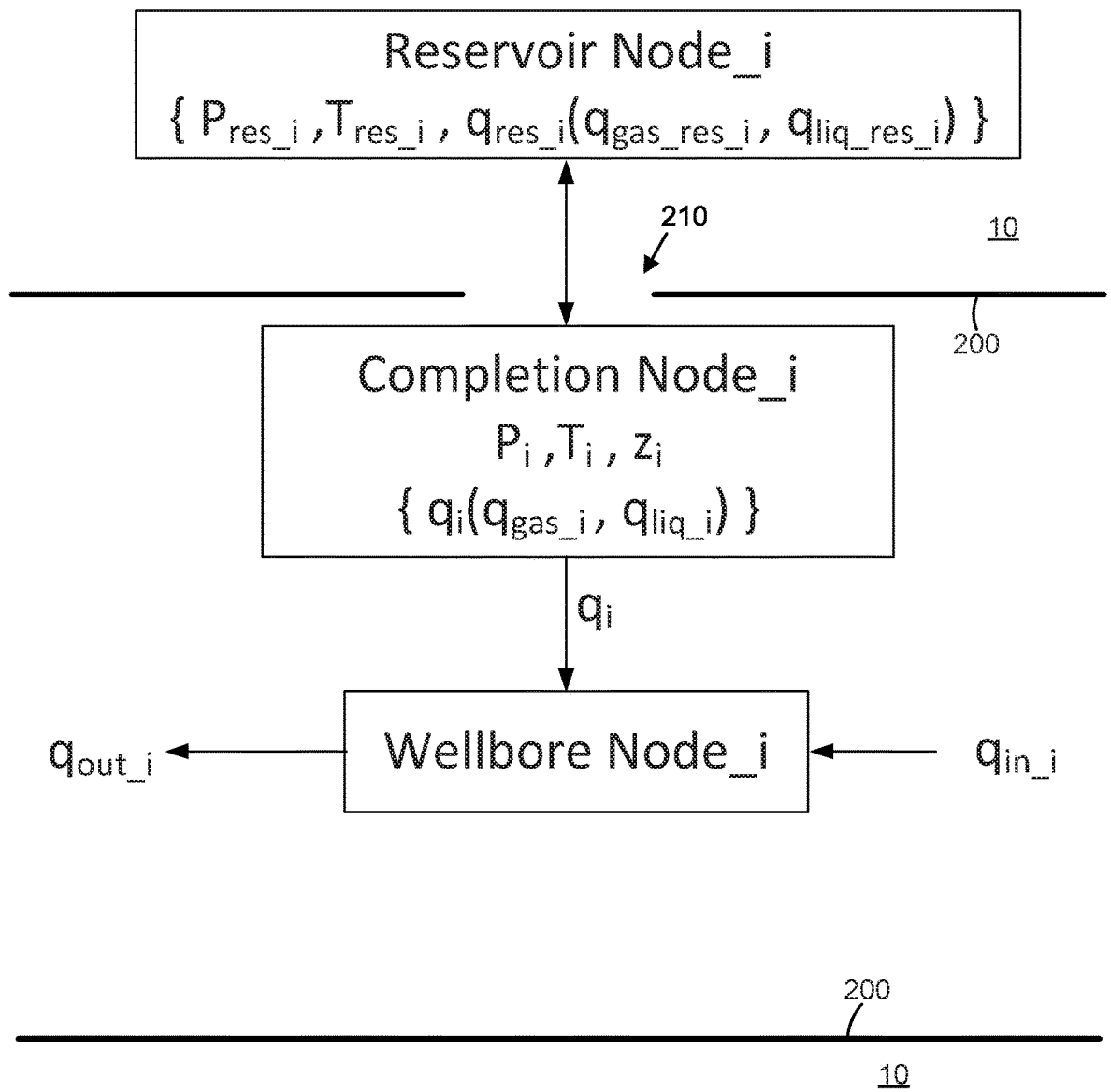
FIG. 5 is a diagrammatic illustration of a completion node, a reservoir node, and a wellbore node.

To estimate the local incoming fluid flow rate for a number of locations or zones along the producer wellbore using local pressure and temperature data, a nodal analysis method may be used. Turning to FIG. 5, each inflow zone along the horizontal segment of the producer wellbore for which local temperature and pressure data is available may be characterized as a completion node. For each such node, illustrated in FIG. 5 as Completion Node_i, a local pressure $P_i$ and a local temperature $T_i$ may be determined using local pressure sensors and local temperature sensors, respectively. The composition of the fluid entering the wellbore at this Completion Node_i (e.g. a molar fraction of heavy oil, bitumen, steam/water, and/or injected solvent(s)) is represented by $z_i$. The composition $z_i$ may be based on e.g. an a priori estimate (e.g. based on the expected properties of the bitumen in the formation and the composition of the injected fluids), and/or based on sampling of the fluids recovered from the producer during SAGD operation.

In FIG. 5, the local incoming flow rate into the producer from the formation is represented by $q_i$. The flow rate $q_i$ is a sum of the flow rate of fluids in a gaseous phase $q_{gas\_i}$ and the flow rate of fluids in a liquid phase $q_{liq\_i}$. That is, at each completion node the local incoming flow rate $q_i = q_{gas\_i} + q_{liq\_i}$. For locations where the liquid level h is above the producer wellbore (i.e. where there is no 'steam coning'), $q_{gas\_i}$ may be assumed to be zero, and thus $q_i = q_{liq\_i}$.

At each completion node, the relative phase split $q_i$ ($q_{gas\_i}$, $q_{liq\_i}$) between liquid and gas for the incoming fluid may be estimated based on the local pressure $P_i$, local temperature $T_i$, and composition $z_i$. For example, one or more equilibrium or non-equilibrium flash calculations may be performed to determine the phase split for multi-component fluids.

As shown in FIG. 5, for each Completion Node_i, a corresponding location inside the producer wellbore may be characterized as a wellbore node. For each such node, illustrated in FIG. 5 as Wellbore Node_i, the local outgoing flow rate (i.e. towards the heel of the wellbore) is represented by $q_{out\_i}$. The flow rate $q_{out\_i}$ is a sum of the flow rate of fluids into the wellbore node from within the producer wellbore 200, represented as $q_{in\_i}$ and the local incoming flow rate into the producer from the formation $q_{out\_i}$. That is, at each wellbore node $q_{out\_i} = q_{in\_i} + q_i$.

Also for each Completion Node_i, a corresponding location within the reservoir from which fluids flow into the wellbore may be characterized as a reservoir node. For each such node, illustrated in FIG. 5 as Reservoir Node_i the local reservoir pressure $P_{res\_i}$ and local reservoir temperature $T_{res\_i}$ may be estimated as a function of $P_i$, $T_i$, $q_i$, and one or more other adjustments based on the completion type. The local reservoir flow rate $q_{res\_i}$ (including the phase split $q_{gas\_res\_i}$ and $q_{liq\_res\_i}$) may also be estimated and may be used to determine the pressure drop across the completion and therefore calculate the pressure in the reservoir.

Figure 6:
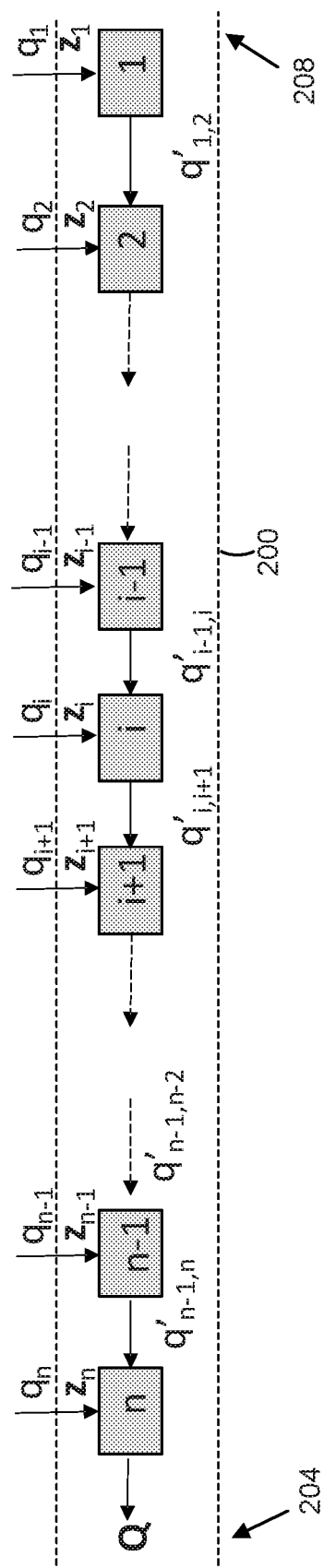
FIG. 6 is a diagrammatic illustration of a series of n wellbore nodes.

To determine the inflow distribution along the producer wellbore, the local inflow at each zone or 'node' may be estimated, and the sum of the local inflow estimates may be compared to a total observed flow rate Q out of the producer (e.g. as measured at the pump 300 or at the wellhead or other location at or near the surface). Turning to FIG. 6, a production wellbore 200 with local pressure and temperature data for n inflow zones along the wellbore may be modeled as a series of n wellbore nodes. In the illustrated example, node 1 is located at the toe 208 of the wellbore 200, node 2 is the next node uphole of node 1, n is located at or near the heel 204 of the wellbore, and node n−1 is the next node located downhole of node n. A generalized intermediate node i is also shown between node i−1 and node i+1. The flow rate within the production wellbore between a pair of adjacent nodes is represented by q'.

To estimate the flow rate q' between a pair of adjacent nodes, a multiphase flow model, such as a Beggs and Brill model, may be used. For example, a multiphase flow model may determine a flow rate q' between a pair of adjacent nodes based on the local temperatures, pressures, and material compositions at each node. That is, the flow rate q' between a pair of adjacent nodes may be estimated as:

$$q'_{i-1,i} = f(P_i, t_i, P_{i-1}, T_{i-1}, z_i, z_{i-1}) \quad (1)$$

where the function f is dependent on the multiphase flow model.

Initially, the local material composition z (e.g. mole fraction) for each node may be assumed to be equal. That is:

$$z_1 = z_2 = \ldots = z_{i-1} = z_i = z_{i+1} = \ldots = z_{n-1} = z_n = z \quad (2)$$

As discussed above with reference to FIG. 5, at each wellbore node, $q_{out\_i} = q_{in\_i} + q_i$. Thus, with reference to FIG. 6, for each wellbore node i:

$$q'_{i,i+1} = q'_{i-1,i} + q_i \quad (3)$$

Which may also be expressed as:

$$q_i = q'_{i,i+1} - q'_{i-1,i} \quad (4)$$

To estimate the local incoming flow rate $q_i$ (including the local phase split between $q_{gas\_i}$ and $q_{liq\_i}$) at each node, a material/energy balance may be applied.

For example, with reference to FIG. 6, for node 1 (i.e. the node closest to the toe), the flow rate from the downhole side of the node $q'_{i-1,i}$ can be assumed to be zero. Thus, $q_1 = q'_{1,2} = f(P_2, T_2, P_1, T_1, z_2, z_1)$.

Next, for node 2, the flow rate $q'_{1,2}$ between node 1 and node 2 has been determined, the flow rate $q'_{2,3}$ between node 2 and node 3 can be estimated using the multiphase flow model, and a material/energy balance may be applied to determine $q_2$ based on $q_2 = q'_{2,3} - q'_{1,2}$ This sequential node-by-node analysis may be continued along the wellbore until the most uphole node (node n in FIG. 6) is reached. At this node, the total observed flow rate Q out of the producer may be substituted for the flow rate out of the uphole side of node n. Put another way: $q'_{n,n+1} = Q$ After determining the local incoming flow rate $q_n$ at the last node, to validate the model, this flow rate $q_n$ may be checked to confirm it is positive—i.e. the model should indicate that fluids are flowing into (not out of) the producer from the formation at this location.

It will be appreciated that while in the example above the analysis started at the node closest to the toe, with the flow rate from the downhole side of the node $q'_{i-1,i}$ assumed to be zero, this need not be the case. For example, the analysis may be performed from heel to toe, by taking the flow rate from the uphole hole side of node n as being equal to the total observed flow rate Q, and validating the model by checking the flow rate $q_1$ to confirm it is positive.

If a validation check indicates that the model may not be valid (e.g. if the local incoming flow rate $q_n$ at the last node is negative for a toe-to-heel analysis), this may indicate that the initial assumption that the local material composition z (e.g. mole fraction) is the same for each node is not valid. To address such situation, an iterative method may be employed to generate revised estimates for the local compositions $z_1$ to $z_n$.

Figure 7:
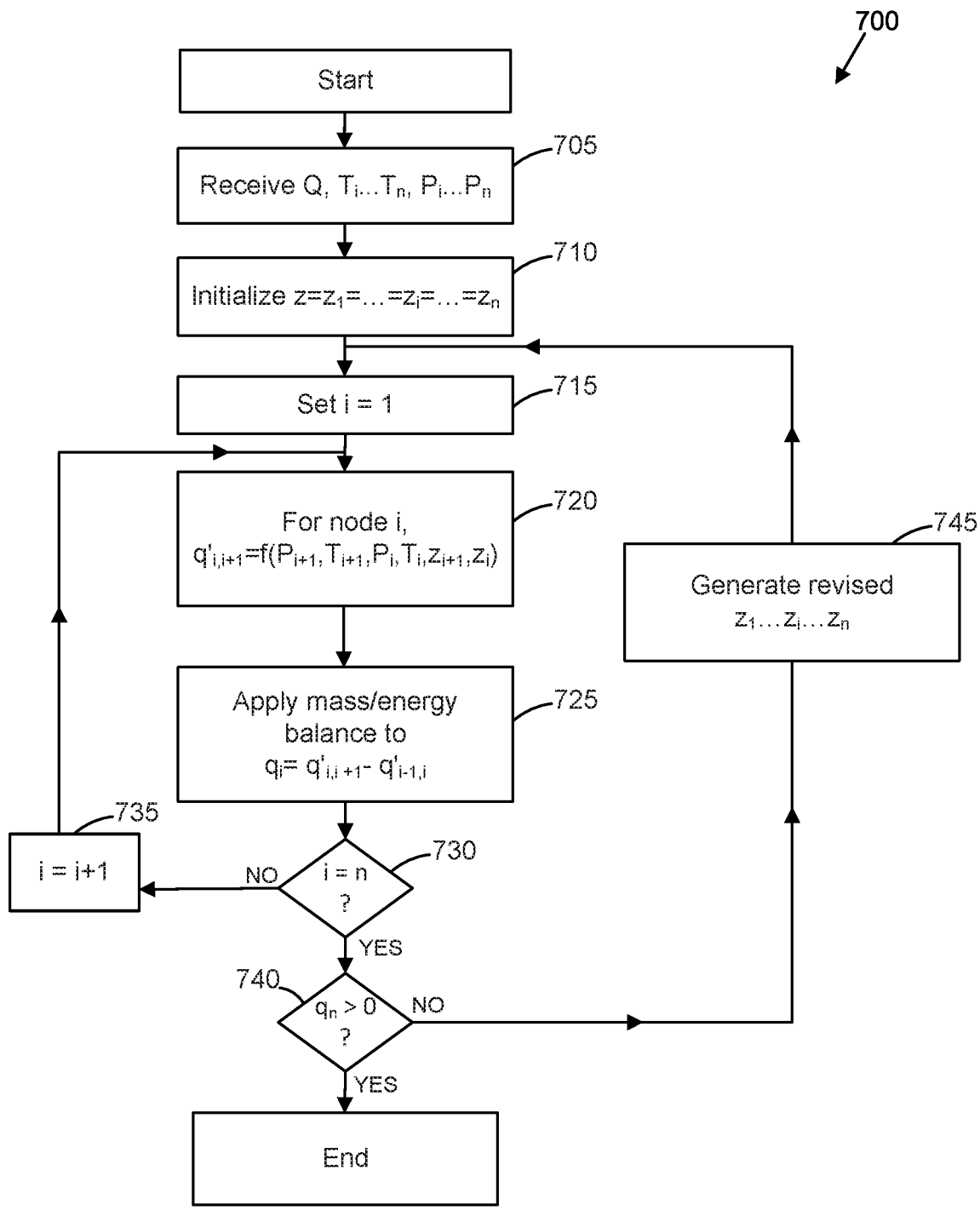
FIG. 7 is a flow diagram for an example nodal analysis method.

Referring to FIG. 7, there is illustrated a method 700 for determining the inflow distribution along the producer wellbore.

At 705, values for $T_1$ to $T_n$, and $P_1$ to $P_n$ are obtained using temperature and pressure sensors distributed along the producer wellbore 200. A value for the total flow rate Q is also obtained, e.g. from the artificial lift device or from one or more separate flowrate sensors located uphole of the inflow locations 210.

At 710, initial values for the material composition $z_1$ to $z_n$ for each inflow location are obtained. For example, the material composition (e.g. mole fraction) for each node may initially be assumed to be equal, and equal to an observed material composition for the fluids recovered from the producer (e.g. during periodic sampling).

At 715, a node index i may be set to 1.

At 720, a multiphase flow model is used to determine a flow rate q' between node i and the adjacent uphole node i+1 based on the local temperatures, pressures, and material compositions at each node.

At 725, a material/energy balance is applied to determine $q_i$ based on $q_i = q'_{i,i+1} - q'_{i-1,i}$ (For node i=1, $q'_{i-1,i}$ is assumed to be zero, and for node n, Q is used for $q'_{i,i+1}$)

At 730, the node index i is checked to see if node n has been reached. If not, the method proceeds to 735 where the node index is incremented by 1, and the method returns to 720. If i=n, the method proceeds to 740, where $q_n$ is checked to confirm it is not negative. If $q_n$ is zero or positive, the determined values for $q_1$ to $q_n$ are presumed to be valid, and the method ends. If $q_n$ is negative, the method proceeds to 745.

At 745, a revised estimate for one or more of the local compositions $z_i$ is generated, and the method returns to 715 and steps 720 to 740 are repeated with the revised estimate. Revised estimates for one or more of the local compositions $z_i$ may be generated using any suitable method. For example, a step-wise method may be employed to generate revised estimates for the local compositions $z_1$ to $z_n$ each time step 745 is performed.

In one example of a step-wise method, upper and lower limits or bounds of $z_i$ variation $z_{min}$ and $z_{max}$ may be initially chosen based on e.g. expected reservoir composition, composition of injected fluids. Then, possible variations for one or more of the local compositions $z_i$ may be incremented from $z_{min}$ and $z_{max}$, and the nodal analysis (e.g. steps 715 to 740 in the example method of FIG. 7) may be repeated for each variation until the model is validated (e.g. until $q_n$ is zero or positive at step 740 in the example method of FIG. 7).

For example, initially, the values for each $z_i$ in $\{z_1 \ldots z_i \ldots z_n\}$ may be incremented between $z_{min}$ and $z_{max}$ one at a time, while holding the other $z_i$'s fixed. Put another way, for each $\{z_i\}$ –vary $z_i$ from $z_{min}$ to $z_{max}$ (i=1 to n).

Each time a $z_i$ value is varied, the multiphase flow model and material/energy calculations may be re-run for the modified set of $z_i$'s. Once a $z_i$ value has been incremented from $z_{min}$ to $z_{max}$, reset that $z_i$ to its initial value and continue varying the next $z_i$ until all $z_i$'s have been varied and run through the multiphase flow model and material/energy calculations.

If each $z_i$ in $\{z_1 \ldots z_i \ldots z_n\}$ has been varied from $z_{min}$ to $z_{max}$ without the nodal analysis model being validated, the values for each $z_i$ in $\{z_1 \ldots z_i \ldots z_n\}$ may then be incremented between $z_{min}$ and $z_{max}$ two at a time, while holding the other $z_i$'s fixed.

For example, for each pair $\{z_j, z_k\}$, vary each z in the pair together starting from $z_{min}$ to $z_{max}$ (j=1 to n−1, k=2 to n), and each time a pair of $z_i$ values are varied, the multiphase flow model and material/energy calculations may be re-run for the modified set of $z_i$'s. Once a pair $\{z_j, z_k\}$ has been incremented from $z_{min}$ to $z_{max}$, reset $z_j$ and $z_j$ to their initial values and continue varying the next $z_i$ pair (i.e. vary the next $\{z_j, z_k\}$ until you get to j=n-1 & k=n) until all sets of modified $z_i$'s have been varied and run through the multiphase flow model and material/energy calculations.

If each pair $\{z_j, z_k\}$ has been varied from $z_{min}$ to $z_{max}$ without the nodal analysis model being validated (i.e. if j=n-1 and k=n, after varying $\{z_{n-1}, z_n\}$ from $z_{min}$ to $z_{max}$), the values for each $z_i$ in $\{z_1 \ldots z_i \ldots z_n\}$ may then be incremented between $z_{min}$ and $z_{max}$ three at a time, while holding the other $z_i$'s fixed.

For example, for each triplet $\{z_j, z_k, z_l\}$, vary each z in the triplet together starting from $z_{min}$ to $z_{max}$ (j=1 to n-2, k=2 to n-1, l=3 to n), and each time a triplet of $z_i$ values are varied, the multiphase flow model and material/energy calculations may be re-run for the modified set of $z_i$'s. Once a triplet $\{z_j, z_k, z_l\}$ has been incremented from $z_{min}$ to $z_{max}$, reset $z_j$ and $z_j$ to their initial values and continue varying the next $z_i$ triplet (i.e. vary the next $\{z_j, z_k, z_l\}$ until you get to j=n-2, k=n-1 & l=n) until all sets of modified $z_i$'s have been varied and run through the multiphase flow model and material/energy calculations.

If each triplet $\{z_j, z_k, z_l\}$ has been varied from $z_{min}$ to $z_{max}$ without the nodal analysis model being validated, the values for each $z_i$ in $\{z_1 \ldots z_i \ldots z_n\}$ may then be incremented between $z_{min}$ and $z_{max}$ four at a time, while holding the other $z_i$'s fixed. If this is unsuccessful, the values for each $z_i$ in $\{z_1 \ldots z_i \ldots z_n\}$ may then be incremented between $z_{min}$ and $z_{max}$ five at a time, and so on.

It will be appreciated that other methods may be employed to generate revised estimates for the local compositions $z_1$ to $z_n$. For example, during a steam bypass event (e.g. steam coning), the initial assumption for the inlet composition z at the location of the bypass may be likely to be invalid. If an inflow or node location is identified as being a location where steam bypass is likely occurring (e.g. due to a combination of a high temperature measurement and high pressure measurement at that location), at that specific node, the inlet composition z may be changed to match the composition of the injected liquids.

The foregoing nodal analysis method may be used to estimate the local incoming fluid flow rate for a number of locations or zones along the producer wellbore. Alternatively, local inflow rates may be estimated using a digital or distributed acoustic sensor (DAS). For example, a local inflow rate could be determined by partitioning the total flow rate by each location or zone using an acoustic amplitude acquired for each zone by a DAS. The amplitude or magnitude of the acoustic signal for each inflow zone may be taken as being proportional to the flowrate for that zone. Accordingly, each local acoustic signal could be normalized with the total observed flow rate Q out of the producer (e.g. as measured at the pump 300 or at the wellhead or other location at or near the surface) to determine the local inflow rate for each zone. To estimate the flow rate between a pair of adjacent inflow zones, a multiphase flow model, such as a Beggs and Brill model, may be used.

FIG. 12 illustrates a schematic longitudinal cross-section of a pair of horizontal wellbores that are provided with acoustic sensors 240 at a number of inflow locations or zones $210_a$-$210_q$ distributed along the length of the horizontal segment 206 of the producer 200. In the illustrated example, each inflow location or zone 210 to the producer has an associated acoustic sensor 240. Each acoustic sensor $240a$-$240_q$ may be a discrete unit, such as a hydrophone, microphone, and the like. Alternatively, a distributed acoustic sensor (DAS) may be used to obtain acoustic data for each inflow zone.

Once the local incoming flow rates $q_i$ (including the local phase split between $q_{gas\_i}$ and $q_{liq\_i}$) and the local fluid composition $z_i$ have been determined for each completion node or inflow zone, the local liquid level above that location or zone may be determined.

As discussed above with reference to FIG. 5, for each completion node (i.e. for each inflow zone 210 along the wellbore 200 for which temperature and pressure data is acquired), a corresponding location within the reservoir from which fluids flow into the wellbore may be characterized as a reservoir node. For each reservoir node, the local reservoir pressure $P_{res\_i}$ and local reservoir temperature $T_{res\_i}$ may be estimated as a function of $P_i$, $T_i$, $q_i$, and one or more other adjustments based on the completion type (e.g. a pressure drop across the reservoir/wellbore interface). Also, the density of the fluid in the reservoir immediately above the producer wellbore 200 may be determined using $P_{res\_i}$, $T_{res\_i}$, and $q_i$.

Figure 8:
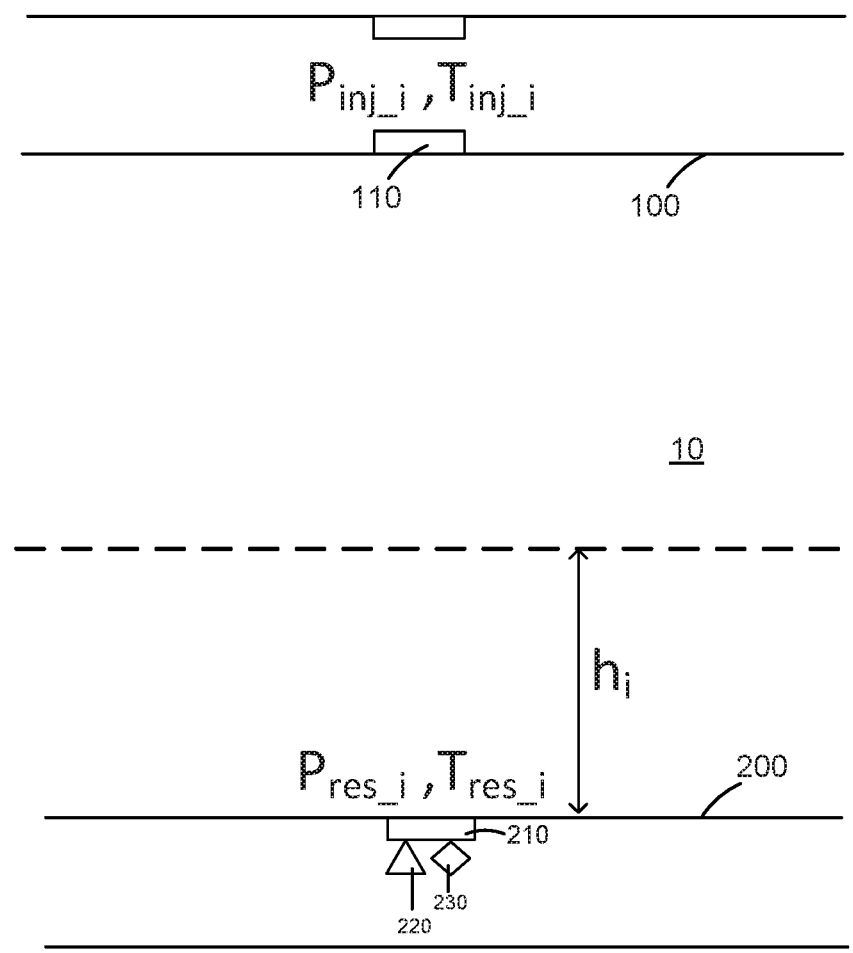
FIG. 8 is a schematic illustration of an estimated liquid level between a pair of horizontal wellbores at a wellbore node.

Turning to FIG. 8, the local liquid level $h_i$ above an inflow location or zone may be determined based on the local reservoir pressure $P_{res\_i}$, the local pressure in the injector wellbore $P_{inj\_i}$ at a point above the local reservoir location, and the local density of the fluid. For example, the local liquid level $h_i$ may be determined using:

$$h_i = \frac{P_{inj\_i} - P_{res\_i}}{\text{fluid density} \times g} \quad (5)$$

where g is the gravitational constant.

For some processes (e.g. the injection of pure steam, or a pure solvent such as pentane, hexane, etc.), the local pressure in the injector wellbore $P_{inj\_i}$ may be assumed constant over the entire length of the wellbore (e.g. $P_{inj\_i}$=$P_{inj}$). In other processes, such as SA-SAGD or VAPEX, this assumption may be less accurate. Alternatively, the pressure distribution along the injector may be estimated from the injection pressure and a frictional flow model along the injection well.

Figure 9:
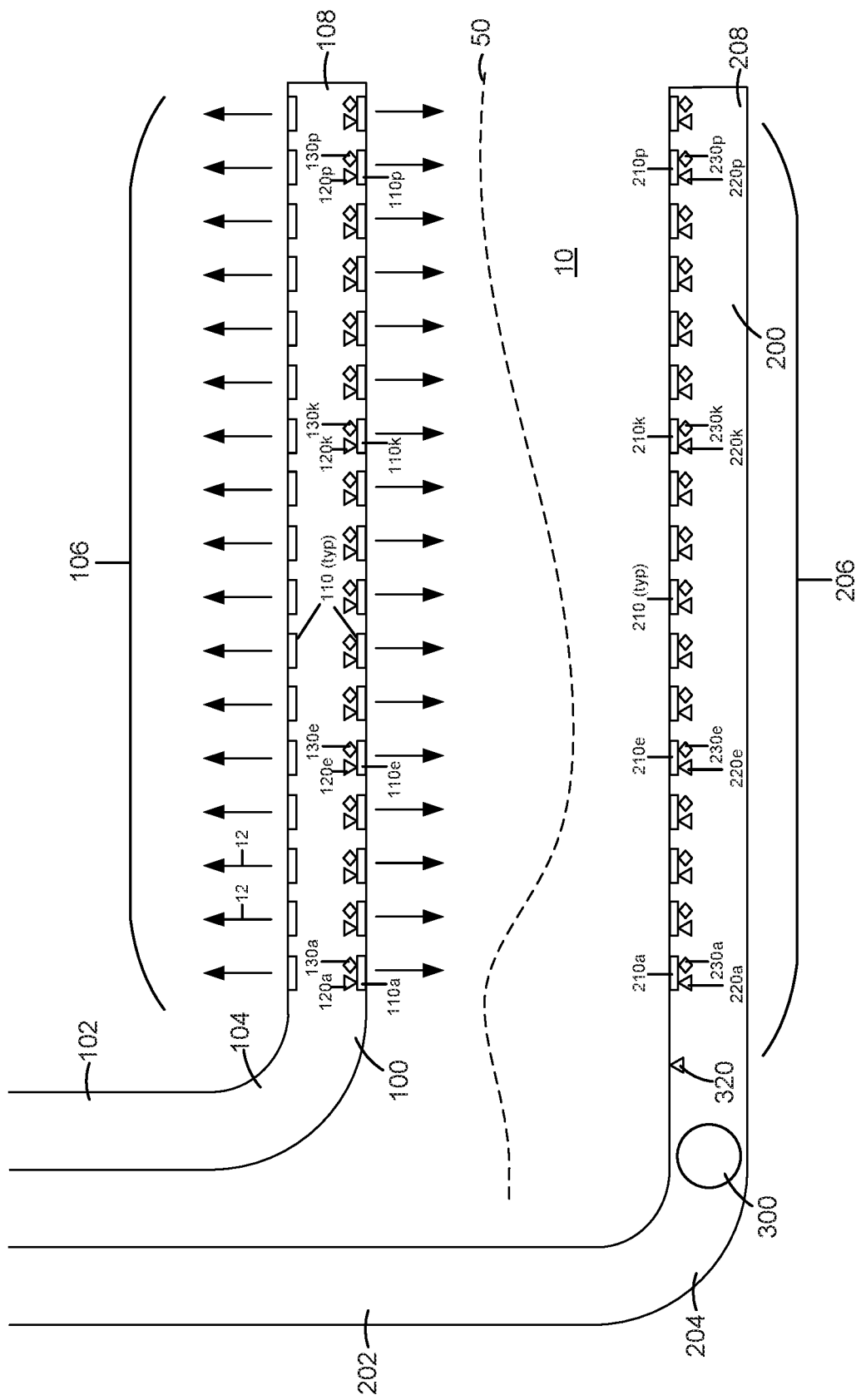
FIG. 9 is a schematic longitudinal cross-section view of a pair of horizontal wellbores in accordance with another example embodiment.

In the example illustrated in FIG. 4, each inflow location or zone 210 along the producer has an associated temperature sensor 220 and an associated pressure sensor 230. In the example illustrated in FIG. 9, each outflow location or zone 110 along the injector also has an associated temperature sensor 120 and an associated pressure sensor 130. As with the sensors for the producer, each pressure sensor and/or each temperature sensor may be a discrete unit, or a distributed data acquisition system may be used to obtain temperature and/or pressure data at each outflow zone 110. That is, the same physical sensor apparatus may function as both a pressure sensor and as a temperature sensor at one or more locations along the injector wellbore.

By obtaining pressure and temperature data for a number of locations distributed along the horizontal segment 106 of the injector wellbore, the local thermodynamic state of the fluid may be estimated at these locations. This may allow a more accurate and/or more detailed model to be developed for the production inflow and/or reservoir conditions along the wellbore, particularly in conjunction with local thermodynamic state estimations for corresponding locations along the producer wellbore. A more detailed model may allow for improved control of production during a SAGD process, and may be particularly useful during a SA-SAGD or VAPEX process, as the local thermodynamic state of the fluid being injected may further improve the detail or 'resolution' of the model where the injected fluids comprise a mix of fluids, as opposed to pure steam (i.e. water) or other pure solvents.

For example, determining the local thermodynamic state of fluid for a number of locations along both the producer and injector wellbores may allow an improved calculation of a pressure drop between the injector wellbore and the producer wellbore, which may enable well pair operation based on liquid level control rather than based on the average subcool.

To estimate the local thermodynamic state of fluid for a number of locations along the injector wellbore, a similar nodal analysis method to that described above with reference to FIGS. 4 to 7 may be used. For example, a local outgoing flow rate and a local material composition (e.g. mole fraction) may be determined for a plurality of locations along the injector wellbore. Preferably these locations may be located vertically above corresponding inflow locations in the producer wellbore.

This thermodynamic state information for the injector may be used in conjunction with thermodynamic state information for the producer to obtain a more accurate and/or more detailed model than using thermodynamic state information for the producer alone. For example, as discussed above with reference to FIG. 8, a local liquid level h may be determined based on the determined local reservoir pressure adjacent the producer $P_{res\_i}$, and a determined local reservoir pressure adjacent the injector $P_{res\_inj\_i}$ at a point above the local reservoir location.

As discussed above, obtaining pressure and temperature data and determining local thermodynamic state information for a number of locations distributed along the horizontal segments of the producer and/or injector wellbores may allow a more accurate and/or more detailed model to be developed for the production inflow and/or reservoir conditions along the wellbore. For such a model to allow for improved control of production during the SAGD process (e.g. by facilitating faster identification and/or responses to system changes), the model is preferably updated in real-time or near-real time to provide current state information. Thus, one or more computing devices may be used to perform some or all of the calculations described herein. For example, it is considered impractical (if not impossible) to determine and display, in a timely manner, an estimate of the liquid level h between the injector and producer at a number of locations along the wellbores without using one or more computing devices.

Also, updating such a model in real-time or near-real time to provide current state information may have one or more advantages. For example, such an updated model may facilitate improved steam conformance by adjusting heel/toe steam rates based on liquid level measurements.

For example, in response to determining that liquid levels are rising and/or above a target value, one or more actions may be taken promote the reduction of liquid levels. Non-limiting examples of such actions include: increasing the total flowrate for fluids exiting the wellbore segment (e.g. by increasing a pump rate of an artificial lift device); increasing an open area of at least one of the plurality of inflow locations, and; unblocking the open area of at least one of the plurality of inflow zones. During such actions, an injection rate may be raised to increase a total flow rate of fluids into the injector wellbore to maintain chamber pressure as the liquid level falls (e.g. the injection rate may be 'ramped up' temporarily, and then 'dialed back' to (approximately) the same rate once the liquid level has stabilized at a lower level), or the injection rate may be lowered, in order to decrease a total flow rate of fluids into the injector wellbore.

In response to determining that liquid levels are falling and/or below a target value, one or more actions may be taken promote an increase of liquid levels. Non-limiting examples of such actions include: decreasing the total flow-rate for fluids exiting the wellbore segment (e.g. by decreasing a pump rate of an artificial lift device); decreasing an open area of at least one of the plurality of inflow locations, and; blocking the open area of at least one of the plurality of inflow zones. During such actions, an injection rate may be lowered to decrease a total flow rate of fluids into the injector wellbore to maintain chamber pressure as the liquid level rises (e.g. the injection rate may be 'dialed back' temporarily, and then 'ramped up' to (approximately) the same rate once the liquid level has stabilized at a higher level), or the injection rate may be raised, in order to increase a total flow rate of fluids into the injector wellbore.

It will be appreciated that other actions may be taken in response to high/rising or low/falling liquid levels. For example, in response to determining that liquid levels are rising and/or above a target value, an injection rate may be raised to increase a total flow rate of fluids into the injector wellbore, which may lead to lower or maintained liquid levels in the steam chamber, but only after a significant time delay. However, an increase in the injection rate may also result in an increase in the steam chamber temperature, which may increase the bitumen drainage rate in the steam chamber due to a reduction in bitumen viscosity. However, this impact may also have a significant time delay in that changes to the injection rate result in changes to the bitumen drainage rate at a time significantly delayed from the change in injection rate. Therefore, in embodiments herein, the control of the injection rate may have to be independently controlled (i.e., either increased or decreased) in any liquid level control situation, independent of the other liquid level control steps described herein.

Alternatively, or additionally, such an updated model may facilitate reducing gas vapor fractions in the producer, which in turn may reduce or preferably minimize pump failure and liner failures due to high velocity flows through the completions (e.g. possibly with sand moving with the high velocity fluid).

The various embodiments of the methods and systems described herein may be implemented using a combination of hardware and software. These embodiments may be implemented in part using computer programs executing on one or more programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, suitable computing devices may include one or more of a server, a network appliance, an embedded device, a personal computer, a laptop, a wireless device, or any other computing device capable of being configured to carry out some or all of the methods described herein.

In at least some of the embodiments described herein, program code may be applied to input data to perform at least some of the functions described herein and to generate output information. The output information may be applied to one or more output devices, for display or for further processing.

For example, a computer monitor or other display device may be configured to display a graphical representation of determined local liquid levels for some or all of the inflow zones. In some embodiments, a schematic representation of the injector, producer, and formation (e.g. similar to FIGS. 2-4 and 9-12) may be displayed, along with a representation (e.g. a line, one or more line segments, or other symbols or indicia) of local liquid levels in the reservoir. For example, a representation of local liquid levels for all or some (e.g. 10%, 20%, or 50%) of the length between the heel and the toe of the wellbore segment may be displayed.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

EMBODIMENTS

Additional embodiments of the invention herein are as follows:

Embodiment 1

A system for determining a liquid level in a formation above a horizontal segment of a wellbore, the system comprising:
at least one temperature sensor positioned in the wellbore segment to measure a local temperature for each of a plurality of inflow zones between a heel and a toe of the wellbore segment;
at least one pressure sensor positioned in the wellbore segment to measure a local pressure for each of the plurality of inflow zones;
at least one flow rate sensor to measure a total flowrate for fluids exiting the wellbore segment via the wellbore; and one or more processors operatively coupled to the at least one temperature sensor, the at least one pressure sensor, and the flow rate sensor, the one or more processors, collectively, configured to:
determine local temperatures for each of the plurality of inflow zones using the at least one temperature sensor;
determine local pressures for each of the plurality of inflow zones using the at least one pressure sensor;
determine the total flowrate for fluids exiting the wellbore segment via the wellbore using the at least one flow rate sensor;
for each of the plurality of inflow zones:
determine a local inflow rate for fluids entering the wellbore segment from the formation for that inflow zone, based on the local temperature and the local pressure determined for that inflow zone, the local temperature and the local pressure determined for at least one other inflow zone, and at least one value based on a composition of the fluids entering the wellbore segment from the formation at that inflow zone, and
for at least one of the plurality of inflow zones:
determine a local reservoir pressure for a location in the formation above that inflow zone, based on the local inflow rate, the local temperature, and the local pressure for that inflow zone, and
determine a local liquid level, based on the local reservoir pressure and a pressure associated with an injector wellbore positioned above the wellbore segment.

Embodiment 2

The system of embodiment 1, wherein the at least one temperature sensor comprises a thermocouple or a set of thermocouples.

Embodiment 3

The system of embodiment 1, wherein the at least one temperature sensor comprises a distributed temperature sensor (DTS).

Embodiment 4

The system of any one of embodiments 1 to 3, wherein the at least one pressure sensor comprises a distributed pressure sensing system.

Embodiment 5

The system of any one of embodiments 1 to 4, wherein the at least one pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones by interpolation using pressures from discrete pressure sensors positioned in other inflow zones.

Embodiment 6

The system of any one of embodiments 1 to 5, wherein the one or more processors are further configured to, when determining, for each of the plurality of inflow zones, a local inflow rate for fluids entering the wellbore segment from the formation for that inflow zone:

determine a local incoming flow rate for fluids flowing from a portion of the wellbore segment located upstream of that inflow zone, based on the local temperature and the local pressure at that inflow zone, the at least one value based on a composition of the fluids entering the wellbore segment from the formation at that inflow zone, and the local temperature and the local pressure for an inflow zone upstream of that location;

determine a local outgoing flow rate for fluids flowing to a portion of the wellbore segment located downstream of that inflow zone, based on the local temperature and the local pressure at that inflow zone, the at least one value based on a composition of the fluids entering the wellbore segment from the formation at that inflow zone, and the local temperature and the local pressure for an inflow zone downstream of that location;

wherein the local incoming flow rate and the local outgoing flow rate are determined using a multiphase flow model; and determine the local inflow rate based on a difference between the local incoming flow rate and the local outgoing flow rate and a mass/energy balance.

Embodiment 7

The system of embodiment 6, wherein the one or more processors are further configured to, when determining, for each of the plurality of inflow zones, a local inflow rate for fluids entering the wellbore segment from the formation for that inflow zone:

initially determine the local inflow rate for either the inflow zone of the plurality of inflow zones located closest to the toe of the wellbore segment or the inflow zone of the plurality of inflow zones closest to the heel of the wellbore segment, and subsequently determining the local inflow rates sequentially for each of the remaining inflow zones in the plurality of inflow zones.

Embodiment 8

The system of embodiment 7, wherein the one or more processors are further configured to, when determining, for each of the plurality of inflow zones, a local inflow rate for fluids entering the wellbore segment from the formation for that inflow zone:

initially determine the local inflow rate for each inflow zone of the plurality of inflow zones, and, in response to determining that at least one of the local inflow rates is non-negative, varying the at least one value based on a composition of the fluids entering the wellbore from the formation for at least one inflow zone, and subsequently re-determining a local inflow rate for each inflow zone in the plurality of inflow zones.

Embodiment 9

The system of any one of embodiments 1 to 8, wherein the one or more processors are further configured to, when determining, for each of the plurality of inflow zones, a local inflow rate for fluids entering the wellbore segment from the formation for that inflow zone:

determine a local phase split for fluids entering the wellbore segment from the formation for that inflow zone, based on the local inflow rate, the local temperature, and the local pressure for that location.

Embodiment 10

The system of any one of embodiments 1 to 9, wherein the plurality of inflow zones comprises at least five inflow zones.

Embodiment 11

The system of any one of embodiments 1 to 10, wherein the system further comprises a display device operatively coupled to the one or more processors, and wherein the one or more processors are further configured to cause the display device to display a graphical representation of the determined local liquid levels for the at least one of the plurality of inflow zones.

Embodiment 12

The system of embodiment 11, wherein the graphical representation of the determined local liquid levels for the at least one of the plurality of inflow zones comprises a representation of local liquid levels for at least ten percent of a length between the heel and the toe of the wellbore segment.

Embodiment 13

A method for determining a liquid level in a formation above a horizontal segment of a wellbore, the method comprising:

measuring, using at least one temperature sensor positioned in the wellbore segment, a local temperature for each of a plurality of inflow zones between a heel and a toe of the wellbore segment;

measuring, using at least one pressure sensor positioned in the wellbore segment, a local pressure for each of the plurality of inflow zones;

measuring a total flowrate for fluids exiting the wellbore segment;

determining, for each of the plurality of inflow zones:

a local inflow rate for fluids entering the wellbore segment from the formation for that inflow zone, and determining, for at least one of the plurality of inflow zones:

a local reservoir pressure for a location in the formation above that inflow zone, based on the local inflow rate, the local temperature, and the local pressure for that inflow zone, and a local liquid level, based on the local reservoir pressure and a pressure associated with an injector wellbore positioned above the wellbore segment.

Embodiment 14

The method of embodiment 13, wherein, for each of the plurality of inflow zones, a local inflow rate for fluids entering the wellbore segment from the formation for that inflow zone is determined based on the local temperature and the local pressure at that inflow zone, the local temperature and the local pressure for at least one other inflow zone, and at least one value based on a composition of the fluids entering the wellbore from the formation at that inflow zone.

Embodiment 15

The method of embodiment 13 or embodiment 14, wherein determining, for each of the plurality of inflow zones, a local inflow rate for fluids entering the wellbore segment from the formation for that inflow zone further comprises:
  comparing the total flowrate for fluids exiting the wellbore segment to a sum of the local inflow rates for each of the plurality of inflow zones; and
  in response to the total flowrate and the sum of the local inflow rates differing by a predetermined amount:
    updating the at least one value based on a composition of the fluids entering the wellbore segment from the formation for at least one inflow zone, and
    re-determining, for each of the plurality of inflow zones, the local inflow rate for fluids entering the wellbore segment from the formation at that inflow zone.

Embodiment 16

The method of embodiment 13, further comprising:
  measuring, using at least one acoustic sensor positioned in the wellbore segment, a local acoustic signal for each of the plurality of inflow zones, and
  wherein determining, for each of the plurality of inflow zones, a local inflow rate for fluids entering the wellbore segment from the formation for that inflow zone further comprises comparing the local acoustic signal for that inflow zone to the local acoustic signals for each of the plurality of inflow zones and to the total flowrate for fluids exiting the wellbore segment.

Embodiment 17

The method of any one of embodiments 13 to 16, further comprising:
  after determining the local liquid level for at least one of the plurality of inflow zones at a first time:
    re-determining the local liquid level for at least one of the plurality of inflow zones at a second time;
    comparing the determined local liquid level for at least one of the plurality of inflow zones at the first time and at the second time;
    in response to the determined local liquid level for at least one of the plurality of inflow zones at the second time being greater than the determined local liquid level for at least one of the plurality of inflow zones at the first time, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and
    in response to the determined local liquid level for at least one of the plurality of inflow zones at the first time being greater than the determined local liquid level for at least one of the plurality of inflow zones at the second time, performing at least one of: decreasing the pump rate of the artificial lift device to decrease the total flowrate for fluids exiting the wellbore segment; decreasing the open area of at least one of the plurality of inflow zones; and blocking the open area of at least one of the plurality of inflow zones.

Embodiment 18

The method of embodiment 17, wherein, in response to the determined local liquid level for at least one of the plurality of inflow zones at the second time being greater than the determined local liquid level for at least one of the plurality of inflow zones at the first time, the method further comprises increasing an injection rate of a fluid injector to increase a total flow rate of fluids into the injector wellbore, in order to maintain pressure in a steam chamber.

Embodiment 19

The method of embodiment 17, wherein, in response to the determined local liquid level for at least one of the plurality of inflow zones at the second time being greater than the determined local liquid level for at least one of the plurality of inflow zones at the first time, the method further comprises decreasing an injection rate of a fluid injector to decrease a total flow rate of fluids into the injector wellbore, in order to decrease a bitumen drainage rate in a steam chamber.

Embodiment 20

The method of embodiment 17, wherein, in response to the determined local liquid level for at least one of the plurality of inflow zones at the first time being greater than the determined local liquid level for at least one of the plurality of inflow zones at the second time, the method further comprises decreasing an injection rate of a fluid injector to decrease a total flow rate of fluids into the injector wellbore, in order to maintain pressure in a steam chamber.

Embodiment 21

The method of embodiment 17, wherein, in response to the determined local liquid level for at least one of the plurality of inflow zones at the first time being greater than the determined local liquid level for at least one of the plurality of inflow zones at the second time, the method further comprises increasing an injection rate of a fluid injector to increase a total flow rate of fluids into the injector wellbore, in order to increase a bitumen drainage rate in a steam chamber.

Embodiment 22

The method of any one of embodiments 13 to 16, further comprising:
  after determining the local liquid level for at least one of the plurality of inflow zones:
    comparing the determined local liquid level for at least one of the plurality of inflow zones to a target liquid level;
    in response to the determined local liquid level for at least one of the plurality of inflow zones being greater than the target liquid level, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and
    in response to the target liquid level being greater than the determined local liquid level for at least one of the plurality of inflow zones, performing at least one of: decreasing the pump rate of the artificial lift device to decrease the total flowrate for fluids exiting the wellbore segment; and decreasing the open area of at least one of the plurality of inflow zones; and blocking the open area of at least one of the plurality of inflow zones.

Embodiment 23

The method of embodiment 22, wherein, in response to the determined local liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

Embodiment 24

The method of embodiment 22, wherein, in response to the determined local liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

Embodiment 25

The method of embodiment 22, wherein, in response to the target liquid level being greater than the determined local liquid level for at least one of the plurality of inflow zones, the method further comprises decreasing an injection rate of a fluid injector to decrease a total flow rate of fluids into the injector wellbore, in order to maintain pressure in a steam chamber.

Embodiment 26

The method of embodiment 22, wherein, in response to the target liquid level being greater than the determined local liquid level for at least one of the plurality of inflow zones, the method further comprises increasing an injection rate of a fluid injector to increase a total flow rate of fluids into the injector wellbore, in order to increase a bitumen drainage rate in a steam chamber.

Embodiment 27

A system for determining a liquid level in a formation between a horizontal segment of an injection wellbore and a horizontal segment of a production wellbore, the system comprising:
  at least one first temperature sensor positioned in the injection wellbore to measure a local temperature for each of a plurality of injection zones between a heel and a toe of the injection wellbore segment;
  at least one first pressure sensor positioned in the injection wellbore to measure a local pressure for each of the plurality of injection zones;
  at least one first flow rate sensor to measure a total flowrate for fluids entering the injection wellbore segment via the injection wellbore;
  at least one second temperature sensor positioned in the production wellbore segment to measure a local temperature for each of a plurality of production zones between a heel and a toe of the production wellbore segment;
  at least one second pressure sensor positioned in the production wellbore segment to measure a local pressure for each of the plurality of production zones;
  at least one second flow rate sensor to measure a total flowrate for fluids exiting the production wellbore segment via the production wellbore;
  one or more processors operatively coupled to the at least one first temperature sensor, the at least one first pressure sensor, the first flow rate sensor, the at least one second temperature sensor, the at least second first pressure sensor, the second flow rate sensor, and a display device, the one or more processors, collectively, configured to:
    determine local temperatures for each of the plurality of injection zones using the at least one first temperature sensor;
    determine local pressures for each of the plurality of injection zones using the at least one first pressure sensor;
    determine the total flowrate for fluids entering the injection wellbore segment via the injection wellbore using the at least one first flow rate sensor;
    determine local temperatures for each of the plurality of production zones using the at least one second temperature sensor;
    determine local pressures for each of the plurality of production zones using the at least one second pressure sensor;
    determine the total flowrate for fluids exiting the production wellbore segment via the production wellbore using the at least one second flow rate sensor;
    for each of the plurality of injection zones:
      determine a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and
      determine a local formation pressure for a location in the formation proximate that injection zone, based on the local injection flow rate, and the local temperature and the local pressure at that injection zone;
    for each of the plurality of production zones:
      determine a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and,
      determine a local reservoir pressure for a location in the formation above that inflow zone, based on the local inflow rate, and the local temperature and the local pressure at that production zone; and
    determine, for at least one of the plurality of production zones:
      a local liquid level, based on the local reservoir pressure for the location in the formation above that production zone and the local formation pressure for the location in the formation proximate an injection zone horizontally aligned with that production zone.

Embodiment 28

The system of embodiment 27, wherein the one or more processors are further configured to cause the display device to display a graphical representation of the determined local liquid levels.

Embodiment 29

A method for determining a liquid level in a formation between a horizontal segment of an injection wellbore and a horizontal segment of a production wellbore, the method comprising:
  measuring, using at least one first temperature sensor positioned in the injection wellbore, a local temperature for each of a plurality of injection zones between a heel and a toe of the injection wellbore segment;
  measuring, using at least one first pressure sensor positioned in the injection wellbore, a local pressure for each of the plurality of injection zones;
  measuring a total flowrate for fluids entering the injection wellbore segment via the injection wellbore;
  determining, for each of the plurality of injection zones:
    a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and
    a local formation pressure for a location in the formation proximate that injection zone, based on the local injection flow rate, and the local temperature and the local pressure at that injection zone;
  measuring, using at least one second temperature sensor positioned in the production wellbore, a local temperature for each of a plurality of production zones between a heel and a toe of the production wellbore segment;
  measuring, using at least one second pressure sensor positioned in the production wellbore, a local pressure for each of the plurality of production zones;
  measuring a total flowrate for fluids exiting the production wellbore segment via the production wellbore;
  determining, for each of the plurality of production zones:
    a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and,
    a local reservoir pressure for a location in the formation above that production zone, based on the local inflow rate, and the local temperature and the local pressure at that production zone; and
  determining, for at least one of the plurality of production zones:
    a local liquid level, based on the local reservoir pressure for the location in the formation above that production zone and the local formation pressure for the location in the formation proximate an injection zone horizontally aligned with that production zone.

Embodiment 30

The method of embodiment 29, wherein a local liquid level is determined for each of the plurality of production zones.

Embodiment 31

The method of embodiment 29 or embodiment 30, further comprising:
  after determining the local liquid level for at least one of the plurality of production zones at a first time:
    re-determining the local liquid level for at least one of the plurality of production zones at a second time;
    comparing the determined local liquid level for at least one of the plurality of production zones at the first time and at the second time;
    in response to the determined local liquid level for at least one of the plurality of production zones at the second time being greater than the determined local liquid level for at least one of the plurality of production zones at the first time, performing at least one of: increasing a pump rate of an artificial lift device to increase the total flowrate for fluids exiting the production wellbore segment; increasing an open area of at least one of the plurality of inflow zones; and unblocking the open area of at least one of the plurality of inflow zones; and
    in response to the determined local liquid level for at least one of the plurality of production zones at the first time being greater than the determined local liquid level for at least one of the plurality of production zones at the second time, performing at least one of: decreasing the pump rate of the artificial lift device to decrease the total flowrate for fluids exiting the production wellbore segment; decreasing the open area of at least one of the plurality of inflow zones; and blocking the open area of at least one of the plurality of inflow zones.

Embodiment 32

The method of embodiment 31, wherein, in response to the determined local liquid level for at least one of the plurality of inflow zones at the second time being greater than the determined local liquid level for at least one of the plurality of inflow zones at the first time, the method further comprises increasing an injection rate of a fluid injector to increase a total flow rate of fluids into the injector wellbore, in order to maintain pressure in a steam chamber.

Embodiment 33

The method of embodiment 31, wherein, in response to the determined local liquid level for at least one of the plurality of inflow zones at the second time being greater than the determined local liquid level for at least one of the plurality of inflow zones at the first time, the method further comprises decreasing an injection rate of a fluid injector to decrease a total flow rate of fluids into the injector wellbore, in order to decrease a bitumen drainage rate in a steam chamber.

Embodiment 34

The method of embodiment 31, wherein, in response to the determined local liquid level for at least one of the plurality of inflow zones at the first time being greater than the determined local liquid level for at least one of the plurality of inflow zones at the second time, the method further comprises decreasing an injection rate of a fluid injector to decrease a total flow rate of fluids into the injector wellbore, in order to maintain pressure in a steam chamber.

Embodiment 35

The method of embodiment 31, wherein, in response to the determined local liquid level for at least one of the plurality of inflow zones at the first time being greater than the determined local liquid level for at least one of the plurality of inflow zones at the second time, the method further comprises increasing an injection rate of a fluid injector to increase a total flow rate of fluids into the injector wellbore, in order to increase a bitumen drainage rate in a steam chamber.

Embodiment 36

The method of embodiment 29 or embodiment 30, further comprising:
  after determining the local liquid level for at least one of the plurality of production zones:
    comparing the determined local liquid level for at least one of the plurality of production zones to a target liquid level;
    in response to the determined local liquid level for at least one of the plurality of production zones being greater than the target liquid level, performing at least one of: increasing a pump rate of an artificial lift device to increase the total flowrate for fluids exiting the production wellbore segment; increasing an open area of at least one of the plurality of inflow zones; and unblocking the open area of at least one of the plurality of inflow zones; and
    in response to the target liquid level being greater than the determined local liquid level for at least one of the plurality of production zones, performing at least one of: decreasing the pump rate of the artificial lift device to decrease the total flowrate for fluids exiting the production wellbore segment; decreasing the open area of at least one of the plurality of inflow zones; and blocking the open area of at least one of the plurality of inflow zones.

Embodiment 37

The method of embodiment 36, wherein, in response to the determined local liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

Embodiment 38

The method of embodiment 36, wherein, in response to the determined local liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

Embodiment 39

The method of embodiment 36, wherein, in response to the target liquid level being greater than the determined local liquid level for at least one of the plurality of inflow zones, the method further comprises decreasing an injection rate of a fluid injector to decrease a total flow rate of fluids into the injector wellbore, in order to maintain pressure in a steam chamber.

Embodiment 40

The method of embodiment 36, wherein, in response to the target liquid level being greater than the determined local liquid level for at least one of the plurality of inflow zones, the method further comprises increasing an injection rate of a fluid injector to increase a total flow rate of fluids into the injector wellbore, in order to increase a bitumen drainage rate in a steam chamber.

Embodiment 41

A system for determining a liquid level in a formation above a horizontal segment of a wellbore, the system comprising:
  at least one temperature sensor positioned in the wellbore segment to measure a local temperature for each of a plurality of inflow zones between a heel and a toe of the wellbore segment;
  at least one pressure sensor positioned in the wellbore segment to measure a local pressure for each of the plurality of inflow zones;
  at least one first flow rate sensor to measure a total flowrate for fluids exiting the wellbore segment via the wellbore;
  at least one acoustic sensor positioned in the wellbore segment to measure a local acoustic signal for each of the plurality of inflow zones; and
  one or more processors operatively coupled to the at least one temperature sensor, the at least one pressure sensor, the at least one first flow rate sensor, and the acoustic sensor, the one or more processors, collectively, configured to:
    determine local temperatures for each of the plurality of inflow zones using the at least one temperature sensor;
    determine local pressures for each of the plurality of inflow zones using the at least one pressure sensor;
    determine the total flowrate for fluids exiting the wellbore segment via the wellbore using the at least one flow rate sensor;
    determine local acoustic signals for each of the plurality of inflow zones using the at least one acoustic sensor;
    for each of the plurality of inflow zones:
      determine a local inflow rate for fluids entering the wellbore segment from the formation for that inflow zone, based on the local acoustic signal determined for that inflow zone and the total flowrate for fluids exiting the wellbore segment, and for at least one of the plurality of inflow zones:
determine a local reservoir pressure for a location in the formation above that inflow zone, based on the local inflow rate, the local temperature and the local pressure for that inflow zone, and at least one value based on a composition of the fluids entering the wellbore segment from the formation at that inflow zone, and
determine a local liquid level, based on the local reservoir pressure and a pressure associated with an injector wellbore positioned above the wellbore segment.

Embodiment 42

The system of embodiment 41, wherein the at least one temperature sensor comprises a thermocouple or a set of thermocouples.

Embodiment 43

The system of embodiment 41, wherein the at least one temperature sensor comprises a distributed temperature sensor (DTS).

Embodiment 44

The system of any one of embodiments 41 to 42, wherein the at least one pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones by interpolation using pressures from discrete pressure sensors positioned in other inflow zones.

Embodiment 45

The system of any one of embodiments 41 to 44, wherein the at least one acoustic sensor comprises a distributed acoustic sensor (DAS).

Embodiment 46

The system of any one of embodiments 41 to 45, wherein the one or more processors are further configured to, when determining, for each of the plurality of inflow zones, a local inflow rate for fluids entering the wellbore segment from the formation for that inflow zone:
determine a local phase split for fluids entering the wellbore segment from the formation for that inflow zone, based on the local inflow rate, the local temperature, and the local pressure for that location.

Embodiment 47

The system of any one of embodiments 41 to 46, wherein the system further comprises a display device operatively coupled to the one or more processors, and wherein the one or more processors are further configured to cause the display device to display a graphical representation of the determined local liquid levels.

Embodiment 48

The system of embodiment 47, wherein the graphical representation of the determined local liquid levels comprises a representation of local liquid levels for at least ten percent of a length between the heel and the toe of the wellbore segment.

The invention claimed is:
1. A system for determining a liquid level in a formation above a horizontal segment of a wellbore, the system comprising:
at least one temperature sensor positioned in the wellbore segment to measure a local temperature for each of a plurality of inflow zones between a heel and a toe of the wellbore segment;
at least one pressure sensor positioned in the wellbore segment to measure a local pressure for each of the plurality of inflow zones;
at least one flow rate sensor to measure a total flowrate for fluids exiting the wellbore segment via the wellbore; and
one or more processors operatively coupled to the at least one temperature sensor, the at least one pressure sensor, and the flow rate sensor, the one or more processors, collectively, configured to:
determine local temperatures for each of the plurality of inflow zones using the at least one temperature sensor;
determine local pressures for each of the plurality of inflow zones using the at least one pressure sensor;
determine the total flowrate for fluids exiting the wellbore segment via the wellbore using the at least one flow rate sensor;
for each of the plurality of inflow zones:
determine a local inflow rate for fluids entering the wellbore segment from the formation for that inflow zone, based on the local temperature and the local pressure determined for that inflow zone, the local temperature and the local pressure determined for at least one other inflow zone, and at least one value based on a composition of the fluids entering the wellbore segment from the formation at that inflow zone, and
for at least one of the plurality of inflow zones:
determine a local reservoir pressure for a location in the formation above that inflow zone, based on the local inflow rate, the local temperature, and the local pressure for that inflow zone, and
determine a local liquid level, based on the local reservoir pressure and a pressure associated with an injector wellbore positioned above the wellbore segment,
wherein the one or more processors are further configured to, when determining, for each of the plurality of inflow zones, a local inflow rate for fluids entering the wellbore segment from the formation for that inflow zone:
determine a local incoming flow rate for fluids flowing from a portion of the wellbore segment located upstream of that inflow zone, based on the local temperature and the local pressure at that inflow zone, the at least one value based on a composition of the fluids entering the wellbore segment from the formation at that inflow zone, and the local temperature and the local pressure for an inflow zone upstream of that location;
determine a local outgoing flow rate for fluids flowing to a portion of the wellbore segment located downstream of that inflow zone, based on the local temperature and the local pressure at that inflow zone, the at least one value based on a composition of the fluids entering the wellbore segment from the formation at that inflow zone, and the local temperature and the local pressure for an inflow zone downstream of that location;
wherein the local incoming flow rate and the local outgoing flow rate are determined using a multiphase flow model; and
determine the local inflow rate based on a difference between the local incoming flow rate and the local outgoing flow rate and a mass/energy balance.

2. The system of claim 1, wherein the at least one temperature sensor comprises a thermocouple or a set of thermocouples.

3. The system of claim 1, wherein the at least one temperature sensor comprises a distributed temperature sensor (DTS).

4. The system of claim 1, wherein the at least one pressure sensor comprises a distributed pressure sensing system.

5. The system of claim 1, wherein the at least one pressure sensor comprises fewer discrete pressure sensors than the number of inflow zones in the plurality of inflow zones, and wherein, for inflow zones without a discrete pressure sensor positioned therein, the one or more processors are configured to determine local pressures for those inflow zones by interpolation using pressures from discrete pressure sensors positioned in other inflow zones.

6. The system of claim 1, wherein the one or more processors are further configured to, when determining, for each of the plurality of inflow zones, a local inflow rate for fluids entering the wellbore segment from the formation for that inflow zone:
initially determine the local inflow rate for either the inflow zone of the plurality of inflow zones located closest to the toe of the wellbore segment or the inflow zone of the plurality of inflow zones closest to the heel of the wellbore segment, and subsequently determining the local inflow rates sequentially for each of the remaining inflow zones in the plurality of inflow zones.

7. The system of claim 6, wherein the one or more processors are further configured to, when determining, for each of the plurality of inflow zones, a local inflow rate for fluids entering the wellbore segment from the formation for that inflow zone:
initially determine the local inflow rate for each inflow zone of the plurality of inflow zones, and, in response to determining that at least one of the local inflow rates is non-negative, varying the at least one value based on a composition of the fluids entering the wellbore from the formation for at least one inflow zone, and subsequently re-determining a local inflow rate for each inflow zone in the plurality of inflow zones.

8. The system of claim 1, wherein the one or more processors are further configured to, when determining, for each of the plurality of inflow zones, a local inflow rate for fluids entering the wellbore segment from the formation for that inflow zone:
determine a local phase split for fluids entering the wellbore segment from the formation for that inflow zone, based on the local inflow rate, the local temperature, and the local pressure for that location.

9. The system of claim 1, wherein the plurality of inflow zones comprises at least five inflow zones.

10. The system of claim 1, wherein the system further comprises a display device operatively coupled to the one or more processors, and wherein the one or more processors are further configured to cause the display device to display a graphical representation of the determined local liquid levels for the at least one of the plurality of inflow zones.

11. The system of claim 10, wherein the graphical representation of the determined local liquid levels for the at least one of the plurality of inflow zones comprises a representation of local liquid levels for at least ten percent of a length between the heel and the toe of the wellbore segment.

12. The system of claim 1, further comprising at least one acoustic sensor positioned in the wellbore segment to measure a local acoustic signal for each of the plurality of inflow zones;
wherein the one or more processors are operatively coupled to the at least one acoustic sensor, and the one or more processors are configured to determine local acoustic signals for each of the plurality of inflow zones using the at least one acoustic sensor.

13. A method for determining a liquid level in a formation above a horizontal segment of a wellbore, the method comprising:
measuring, using at least one temperature sensor positioned in the wellbore segment, a local temperature for each of a plurality of inflow zones between a heel and a toe of the wellbore segment;
measuring, using at least one pressure sensor positioned in the wellbore segment, a local pressure for each of the plurality of inflow zones;
measuring a total flowrate for fluids exiting the wellbore segment;
determining, for each of the plurality of inflow zones:
a local inflow rate for fluids entering the wellbore segment from the formation for that inflow zone, and
determining, for at least one of the plurality of inflow zones:
a local reservoir pressure for a location in the formation above that inflow zone, based on the local inflow rate, the local temperature, and the local pressure for that inflow zone, and
a local liquid level, based on the local reservoir pressure and a pressure associated with an injector wellbore positioned above the wellbore segment,
further comprising:
measuring, using at least one acoustic sensor positioned in the wellbore segment, a local acoustic signal for each of the plurality of inflow zones, and
wherein determining, for each of the plurality of inflow zones, a local inflow rate for fluids entering the wellbore segment from the formation for that inflow zone further comprises comparing the local acoustic signal for that inflow zone to the local acoustic signals for each of the plurality of inflow zones and to the total flowrate for fluids exiting the wellbore segment.

14. The method of claim 13, wherein, for each of the plurality of inflow zones, a local inflow rate for fluids entering the wellbore segment from the formation for that inflow zone is determined based on the local temperature and the local pressure at that inflow zone, the local temperature and the local pressure for at least one other inflow zone, and at least one value based on a composition of the fluids entering the wellbore from the formation at that inflow zone.

15. The method of claim 14, wherein determining, for each of the plurality of inflow zones, a local inflow rate for fluids entering the wellbore segment from the formation for that inflow zone further comprises:
comparing the total flowrate for fluids exiting the wellbore segment to a sum of the local inflow rates for each of the plurality of inflow zones; and
in response to the total flowrate and the sum of the local inflow rates differing by a predetermined amount:

updating the at least one value based on the composition of the fluids entering the wellbore segment from the formation at that inflow zone, and re-determining, for each of the plurality of inflow zones, the local inflow rate for fluids entering the wellbore segment from the formation at that inflow zone.

16. The method of claim 13, further comprising:
after determining the local liquid level for at least one of the plurality of inflow zones at a first time:
re-determining the local liquid level for at least one of the plurality of inflow zones at a second time;
comparing the determined local liquid level for at least one of the plurality of inflow zones at the first time and at the second time;
in response to the determined local liquid level for at least one of the plurality of inflow zones at the second time being greater than the determined local liquid level for at least one of the plurality of inflow zones at the first time, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and
in response to the determined local liquid level for at least one of the plurality of inflow zones at the first time being greater than the determined local liquid level for at least one of the plurality of inflow zones at the second time, performing at least one of: decreasing the pump rate of the artificial lift device to decrease the total flowrate for fluids exiting the wellbore segment; decreasing the open area of at least one of the plurality of inflow zones; and blocking the open area of at least one of the plurality of inflow zones.

17. The method of claim 16, wherein, in response to the determined local liquid level for at least one of the plurality of inflow zones at the second time being greater than the determined local liquid level for at least one of the plurality of inflow zones at the first time, the method further comprises increasing an injection rate of a fluid injector to increase a total flow rate of fluids into the injector wellbore, in order to maintain pressure in a steam chamber.

18. The method of claim 16, wherein, in response to the determined local liquid level for at least one of the plurality of inflow zones at the second time being greater than the determined local liquid level for at least one of the plurality of inflow zones at the first time, the method further comprises decreasing an injection rate of a fluid injector to decrease a total flow rate of fluids into the injector wellbore, in order to decrease a bitumen drainage rate in a steam chamber.

19. The method of claim 16, wherein, in response to the determined local liquid level for at least one of the plurality of inflow zones at the first time being greater than the determined local liquid level for at least one of the plurality of inflow zones at the second time, the method further comprises decreasing an injection rate of a fluid injector to decrease a total flow rate of fluids into the injector wellbore, in order to maintain pressure in a steam chamber.

20. The method of claim 16, wherein, in response to the determined local liquid level for at least one of the plurality of inflow zones at the first time being greater than the determined local liquid level for at least one of the plurality of inflow zones at the second time, the method further comprises increasing an injection rate of a fluid injector to increase a total flow rate of fluids into the injector wellbore, in order to increase a bitumen drainage rate in a steam chamber.

21. The method of claim 13, further comprising:
after determining the local liquid level for at least one of the plurality of inflow zones:
comparing the determined local liquid level for at least one of the plurality of inflow zones to a target liquid level;
in response to the determined local liquid level for at least one of the plurality of inflow zones being greater than the target liquid level, performing at least one of: increasing a pump rate of an artificial lift device to increase the total flowrate for fluids exiting the wellbore segment; increasing an open area of at least one of the plurality of inflow zones; and unblocking the open area of at least one of the plurality of inflow zones; and
in response to the target liquid level being greater than the determined local liquid level for at least one of the plurality of inflow zones, performing at least one of: decreasing the pump rate of the artificial lift device to decrease the total flowrate for fluids exiting the wellbore segment; and decreasing the open area of at least one of the plurality of inflow zones; and blocking the open area of at least one of the plurality of inflow zones.

22. The method of claim 21, wherein, in response to the determined local liquid level for at least one of the plurality of inflow zones being greater than the target liquid level, the method further comprises increasing an injection rate of a fluid injector to increase a total flow rate of fluids into the injector wellbore, in order to maintain pressure in a steam chamber.

23. The method of claim 21, wherein, in response to the determined local liquid level for at least one of the plurality of inflow zones being greater than the target liquid level, the method further comprises decreasing an injection rate of a fluid injector to decrease a total flow rate of fluids into the injector wellbore, in order to decrease a bitumen drainage rate in a steam chamber.

24. The method of claim 21, wherein, in response to the target liquid level being greater than the determined local liquid level for at least one of the plurality of inflow zones, the method further comprises decreasing an injection rate of a fluid injector to decrease a total flow rate of fluids into the injector wellbore, in order to maintain pressure in a steam chamber.

25. The method of claim 21, wherein, in response to the target liquid level being greater than the determined local liquid level for at least one of the plurality of inflow zones, the method further comprises increasing an injection rate of a fluid injector to increase a total flow rate of fluids into the injector wellbore, in order to increase a bitumen drainage rate in a steam chamber.

26. A system for determining a liquid level in a formation between a horizontal segment of an injection wellbore and a horizontal segment of a production wellbore, the system comprising:
at least one first temperature sensor positioned in the injection wellbore to measure a local temperature for each of a plurality of injection zones between a heel and a toe of the injection wellbore segment;
at least one first pressure sensor positioned in the injection wellbore to measure a local pressure for each of the plurality of injection zones;

at least one first flow rate sensor to measure a total flowrate for fluids entering the injection wellbore segment via the injection wellbore;
at least one second temperature sensor positioned in the production wellbore segment to measure a local temperature for each of a plurality of production zones between a heel and a toe of the production wellbore segment;
at least one second pressure sensor positioned in the production wellbore segment to measure a local pressure for each of the plurality of production zones;
at least one second flow rate sensor to measure a total flowrate for fluids exiting the production wellbore segment via the production wellbore;
one or more processors operatively coupled to the at least one first temperature sensor, the at least one first pressure sensor, the first flow rate sensor, the at least one second temperature sensor, the at least second first pressure sensor, the second flow rate sensor, and a display device, the one or more processors, collectively, configured to:
determine local temperatures for each of the plurality of injection zones using the at least one first temperature sensor;
determine local pressures for each of the plurality of injection zones using the at least one first pressure sensor;
determine the total flowrate for fluids entering the injection wellbore segment via the injection wellbore using the at least one first flow rate sensor;
determine local temperatures for each of the plurality of production zones using the at least one second temperature sensor;
determine local pressures for each of the plurality of production zones using the at least one second pressure sensor;
determine the total flowrate for fluids exiting the production wellbore segment via the production wellbore using the at least one second flow rate sensor;
for each of the plurality of injection zones:
determine a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and
determine a local formation pressure for a location in the formation proximate that injection zone, based on the local injection flow rate, and the local temperature and the local pressure at that injection zone;
for each of the plurality of production zones:
determine a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and,
determine a local reservoir pressure for a location in the formation above that inflow zone, based on the local inflow rate, and the local temperature and the local pressure at that production zone; and
determine, for at least one of the plurality of production zones:
a local liquid level, based on the local reservoir pressure for the location in the formation above that production zone and the local formation pressure for the location in the formation proximate an injection zone horizontally aligned with that production zone.

27. A method for determining a liquid level in a formation between a horizontal segment of an injection wellbore and a horizontal segment of a production wellbore, the method comprising:
measuring, using at least one first temperature sensor positioned in the injection wellbore, a local temperature for each of a plurality of injection zones between a heel and a toe of the injection wellbore segment;
measuring, using at least one first pressure sensor positioned in the injection wellbore, a local pressure for each of the plurality of injection zones;
measuring a total flowrate for fluids entering the injection wellbore segment via the injection wellbore;
determining, for each of the plurality of injection zones:
a local injection flow rate for fluids entering the formation from the injection wellbore for that injection zone, based on the local temperature and the local pressure at that injection zone, the local temperature and the local pressure for at least one other injection zone, and at least one value based on a composition of fluids entering the formation from the injection wellbore for that injection zone; and
a local formation pressure for a location in the formation proximate that injection zone, based on the local injection flow rate, and the local temperature and the local pressure at that injection zone;
measuring, using at least one second temperature sensor positioned in the production wellbore, a local temperature for each of a plurality of production zones between a heel and a toe of the production wellbore segment;
measuring, using at least one second pressure sensor positioned in the production wellbore, a local pressure for each of the plurality of production zones;
measuring a total flowrate for fluids exiting the production wellbore segment via the production wellbore;
determining, for each of the plurality of production zones:
a local inflow rate for fluids entering the production wellbore segment from the formation for that production zone, based on the local temperature and the local pressure at that production zone, the local temperature and the local pressure for at least one other production zone, and at least one value based on a composition of fluids entering the production wellbore from the formation at that production zone, and,
a local reservoir pressure for a location in the formation above that production zone, based on the local inflow rate, and the local temperature and the local pressure at that production zone; and
determining, for at least one of the plurality of production zones:
a local liquid level, based on the local reservoir pressure for the location in the formation above that production zone and the local formation pressure for the location in the formation proximate an injection zone horizontally aligned with that production zone.

28. The method of claim 27, further comprising:
after determining the local liquid level for at least one of
   the plurality of production zones:
   comparing the determined local liquid level for at least
      one of the plurality of production zones to a target
      liquid level;
   in response to the determined local liquid level for at
      least one of the plurality of production zones being
      greater than the target liquid level, performing at
      least one of: increasing a pump rate of an artificial lift
      device to increase the total flowrate for fluids exiting
      the production wellbore segment; increasing an open
      area of at least one of the plurality of inflow zones;
      and unblocking the open area of at least one of the
      plurality of inflow zones; and
   in response to the target liquid level being greater than
      the determined local liquid level for at least one of
      the plurality of production zones, performing at least
      one of: decreasing the pump rate of the artificial lift
      device to decrease the total flowrate for fluids exiting
      the production wellbore segment; decreasing the
      open area of at least one of the plurality of inflow
      zones; and blocking the open area of at least one of
      the plurality of inflow zones.

\* \* \* \* \*